(12) United States Patent
Smaldone et al.

(10) Patent No.: US 11,513,902 B1
(45) Date of Patent: Nov. 29, 2022

(54) SYSTEM AND METHOD OF DYNAMIC SYSTEM RESOURCE ALLOCATION FOR PRIMARY STORAGE SYSTEMS WITH VIRTUALIZED EMBEDDED DATA PROTECTION

(71) Applicant: EMC IP Holding Company LLC, Hopkinton, MA (US)

(72) Inventors: Stephen Smaldone, Woodstock, CT (US); Ian Wigmore, Westborough, MA (US); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 746 days.

(21) Appl. No.: 15/280,723

(22) Filed: Sep. 29, 2016

(51) Int. Cl.
*G06F 11/14* (2006.01)
*H04L 67/1097* (2022.01)
*H04L 41/5067* (2022.01)

(52) U.S. Cl.
CPC ...... *G06F 11/1453* (2013.01); *G06F 11/1456* (2013.01); *H04L 41/5067* (2013.01); *H04L 67/1097* (2013.01); *G06F 2201/815* (2013.01); *G06F 2201/845* (2013.01)

(58) Field of Classification Search
CPC ............. G06F 11/1453; G06F 11/1456; G06F 2201/815; G06F 2201/845; H04L 41/5067; H04L 67/1097
USPC ........................................................ 707/692
See application file for complete search history.

(56) References Cited

U.S. PATENT DOCUMENTS

| | | | | |
|---|---|---|---|---|
| 9,154,589 | B1* | 10/2015 | Klein | H04L 69/329 |
| 9,396,071 | B1* | 7/2016 | Akanda | G06F 9/45533 |
| 2003/0126202 | A1* | 7/2003 | Watt | G06F 9/4401 709/203 |
| 2013/0080408 | A1* | 3/2013 | Cashman | G06F 3/0608 707/692 |
| 2013/0227236 | A1* | 8/2013 | Flynn | G11C 16/26 711/165 |
| 2014/0059311 | A1* | 2/2014 | Oberhofer | G06F 3/061 711/162 |
| 2014/0188804 | A1* | 7/2014 | Gokhale | G06F 21/6218 707/645 |
| 2015/0261439 | A1* | 9/2015 | Kumar | G06F 3/061 711/102 |

(Continued)

*Primary Examiner* — Hosain T Alam
*Assistant Examiner* — Nicholas E Allen
(74) *Attorney, Agent, or Firm* — Womble Bond Dickinson (US) LLP

(57) ABSTRACT

Embodiments provide for a primary storage array having multiple storage tiers. The multiple storage tiers include one or more performance tiers and at least one deduplicated storage tier storing deduplicated data. One embodiment provides for a data storage system including the storage array and an I/O engine to manage I/O requests for the storage array. The data storage system additionally includes a virtual execution environment to execute a virtual backup engine, the virtual backup engine to generate backup data for the one or more storage tiers of primary storage and deduplicate the backup data and a resource manager to manage a resource allocation to the virtual backup engine based on a hint received from the virtual backup engine, the hint associated with a backup operation that has a characterization selected from a set including computationally intensive and I/O intensive.

18 Claims, 20 Drawing Sheets

(56) References Cited

U.S. PATENT DOCUMENTS

| | | | |
|---|---|---|---|
| 2016/0011816 A1* | 1/2016 | Aizman | G06F 3/0604 |
| | | | 711/117 |
| 2016/0011819 A1* | 1/2016 | Guo | G06F 3/061 |
| | | | 711/103 |
| 2016/0048408 A1* | 2/2016 | Madhu | G06F 11/1458 |
| | | | 718/1 |
| 2016/0070652 A1* | 3/2016 | Sundararaman | G06F 3/0619 |
| | | | 711/154 |
| 2016/0078080 A1* | 3/2016 | Chen | G06F 11/1456 |
| | | | 707/654 |
| 2016/0162362 A1* | 6/2016 | Damgar | G06F 9/505 |
| | | | 707/640 |
| 2016/0283274 A1* | 9/2016 | Kochunni | G06F 9/5011 |

\* cited by examiner

SYSTEM AND METHOD OF DYNAMIC SYSTEM RESOURCE ALLOCATION FOR PRIMARY STORAGE SYSTEMS WITH VIRTUALIZED EMBEDDED DATA PROTECTION

FIELD OF THE INVENTION

Embodiments of the present invention relate generally to data storage systems. More particularly, embodiments of the invention relate to virtually provisioned storage systems including deduplicated storage.

BACKGROUND

Modern storage arrays provide quality of service (QoS) mechanisms that allow users to define Service Level Objective (SLO) targets for particular applications or workloads. These SLO definitions typically take into account the available performance in every storage tier within the system in terms of IOPS density (IOPS/GB) of each tier. The addition of deduplication capabilities to a primary storage array, introduces a new dimension that must be considered as colder data migrates from non-deduplicated storage tiers into deduplicated storage tiers. Heat (e.g., access activity) statistics are kept per extent. An extent is a contiguous area of storage reserved for a file in a file system.

When extents are deduplicated into deduplicated storage tiers, the reduction of data copies for that extent can cause a short term increase in access frequency activity for that data causing the tier to promoted from the deduplicated storage tier shortly after the extent has been retired from a performance tier, causing thrashing between deduplicated and non-deduplicated tiers. Thrashing can be particularly problematic for deduplicated data because the rehydration process for deduplicated data is potentially computationally intensive and has negative downstream repercussions for deduplication tier maintenance, such as a need to perform garbage collection activities. Additionally, in a primary storage system having virtualized data protection, the optimal allocation between CPU and I/O resource can differ based on whether a large amount of deduplication operations are necessary for backup operations for the data.

Thus, it would be beneficial if additional maintenance logic were available for the management of data migration and backup operations for a primary storage device having deduplicated and non-deduplicated storage tiers.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the description of the embodiments provided herein, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Storage System Overview

Figure 1:
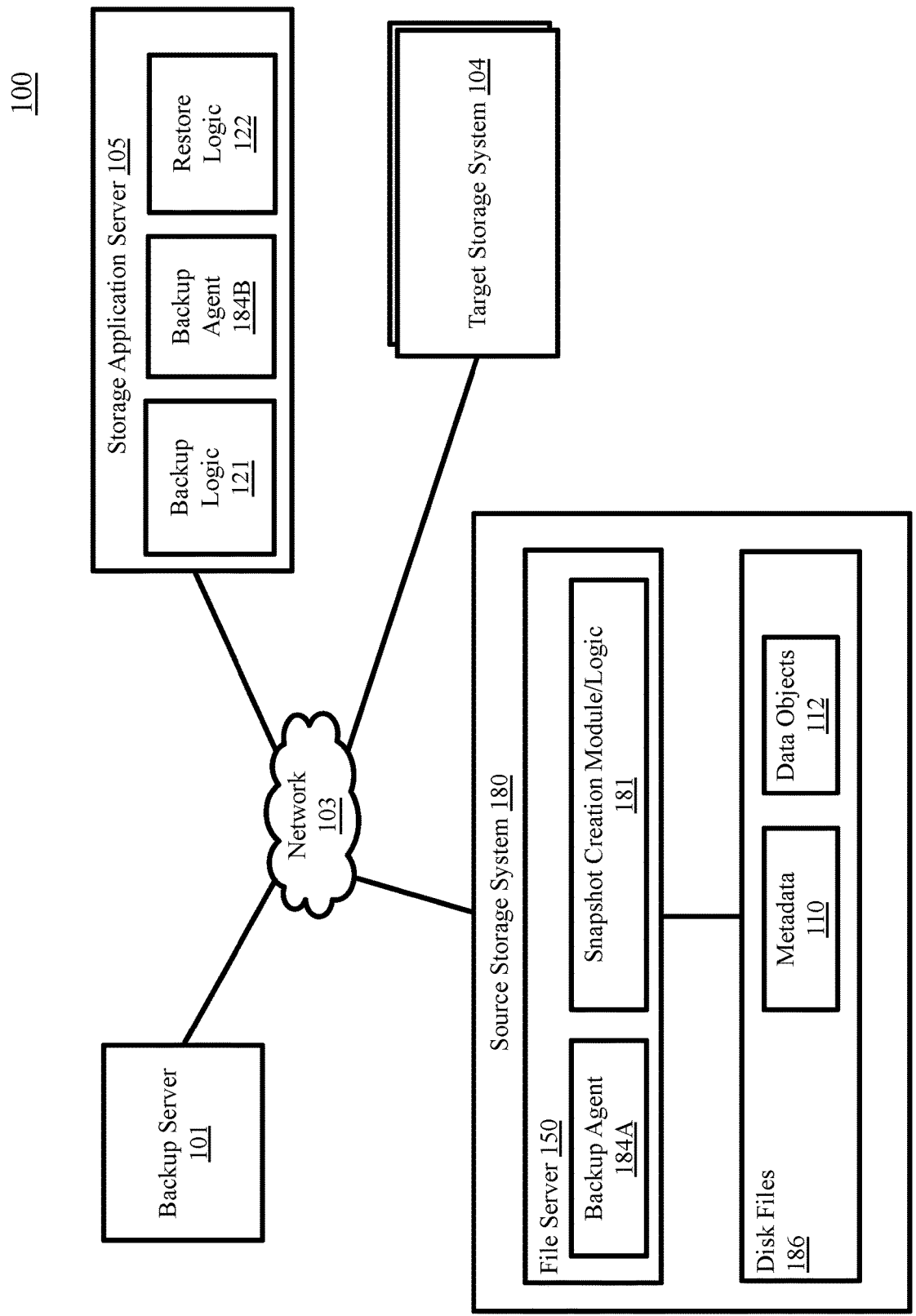
FIG. 1 is a block diagram illustrating a storage system according to an embodiment.

FIG. 1 is a block diagram illustrating a storage system 100 in accordance with one of the embodiments described herein. The storage system 100 includes a backup server 101 coupled to a source storage system 180, a target storage system 104, and a storage application server 105 over a network 103. In one embodiment, the backup server 101 is responsible for managing the backup of a plurality of storage systems and managing the replication of those backups to other local or remote storage systems. The backup server 101 can direct the back up, replication, and restoration of files, folders, databases, and hard drives, solid state drives, etc., over a network in order to prevent the loss of data in the event of a hard drive failure, user error, disaster, or accident. In one embodiment, backup server 101 manages backups by making requests to storage application server 105. For example, and in one embodiment, the backup server 101 manages backups based on requests to backup data that are received from other clients being operated by users (e.g., a personal computer, workstation, etc.). In this example, the backup server 101 processes the received requests and makes backup requests to storage application server 105. In this way, the backup server 101 acts a system level client that makes requests to backup data on the backend. Alternatively, the backup server 101 may be a primary storage system (e.g., local data center) that provides storage to one or more clients, which may periodically back up the content stored therein to a remote backup replication storage system (e.g., a disaster recovery site or system), such as the target storage system 104. These one or more clients may be any type of client system that includes a server, a host, a personal computer (e.g., desktops, laptops, and tablets), a "thin" client, a personal digital assistant (PDA), a Web enabled appliance, or a mobile phone (e.g., Smartphone), etc. Additionally, the storage system 100 can provide multi-client and/or multi-tenant services.

The network 103 may be any type of network, such as a local area network (LAN), a wide area network (WAN) such as the Internet, a fiber network, a storage network, or a combination thereof. A portion of the network may be wired, wireless, or a combination of wired and wireless. The backup server 101 may be in physical proximity or may be physically remote from client(s), source storage system 180, storage application server 105, or target storage system 104. Moreover, each of the backup server 101, source storage system 180, storage application server 105, and target storage system 104 may be in physical proximity with each other or may be physically remote from each other.

The target storage system 104 may include any type of server or cluster of servers. For example, the target storage system 104 may include a storage server used for at least one of a variety of different purposes—for example, to provide multiple users with access to shared data and/or to back up mission critical data. The target storage system 104 may include, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. The target storage system 104 may have a distributed architecture, or all of its components may be integrated into a single unit. The target storage system 104 may be implemented as part of an archive and/or backup storage system such as a deduplication storage system available from Dell EMC® of Hopkinton, Mass.

The source storage system 180 may include any type of server or cluster of servers, which may have the same or similar architecture as the architecture of target storage system 104. In one embodiment, source storage system 180 includes a file server 150 and one or more disk file(s) 186. The source storage system 180 may include a storage device having an appliance used to provide NAS capability or a unified storage device (e.g., one which combines NAS and SAN capabilities, a near-line storage device, a DAS device, a tape backup device, or essentially any other type of data storage device. In one embodiment, the file server 150 is an appliance with NAS capability that implements at least one file sharing protocol (e.g., CIFS, SMB, Samba, etc.). The file server 150 can include one or more hard disk drives, solid state drives, or other storage devices, which may be arranged in logical, redundant storage containers (RAID).

In one embodiment, the file server 150 implements a file system (also known as a "filesystem") that controls how data is stored and retrieved. Various file systems may be used. In one embodiment the file server 150 implements the server message block (SMB) protocol, a dialect of the SMB protocol (e.g., CIFS), or an adaptation of the SMB protocol (e.g., Samba), or another protocol that allows applications to remotely read, create, and update files on the file server 150.

In one embodiment, the file server 150 includes a first backup agent 184A, which provides a backup workflow for the one or more file sharing protocols being implemented by the file server 150. In one embodiment, the one or more file sharing protocols include at least one of SMB, CIFS, or Samba. The file server 150, in one embodiment, also includes snapshot creation logic 181 for creating a snapshot of data to be backed up. The snapshot records information of the data at a point in time. It may be a snapshot of the entire file system, or a snapshot of one or more individual files. The snapshot may include information such as data segment references, content handles, etc.

The source storage system 180 also includes one or more disk file(s) 186 that include the data to be backed up to target storage system 104. In one embodiment, the data to be backed up includes metadata 110 and data objects 112. The disk file(s) 186 can be virtual machine (VM) disk file(s) that are the content files of one or more VMs. A virtual machine (VM) represents a completely isolated operating environment with a dedicated set of virtual resources associated with it. A virtual machine may be installed or launched as a guest operating system (OS) hosted by a host OS or a hypervisor. Typically, a host OS or hypervisor represents a virtual machine monitor (VMM) for managing the hosted virtual machines. A virtual machine can be any type of virtual machine, such as, for example, hardware emulation, full virtualization, para-virtualization, and operating system-level virtualization virtual machines. Different virtual machines hosted by a server (e.g., file server 150, storage application server 105) or a storage system (e.g., source storage system 180, target storage system 104) may have the same or different privilege levels for accessing different resources of the server or storage system. The disk file(s) 186 can also include a second backup agent 184B, which coordinates with the first backup agent 184A to provide a backup workflow for the one or more file sharing protocols being implemented by file server 150.

Source storage system 180 may have a distributed architecture, or all of its components may be integrated into a single unit. Source storage system 180 may be implemented as part of an archive and/or backup system, or a disaster recovery system, such as a continuous replication storage system available from Dell EMC® of Hopkinton, Mass. In one embodiment, the source storage system 180 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a different tier of storage according to one embodiment described herein. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system. Again, the architecture of the source storage system 180 and the target storage system 104 may be identical or similar. The description provided in connection with the source storage system 180 may be applied to the target storage system 104, or vice versa.

The storage application server 105 can coordinate with the target storage system 104, source storage system 180, and backup server 101 to run various backup operations. The storage application server 105 handles all application operations between the backup server 101 and the backend of the storage system 100—i.e., source storage system 180 and target storage system 104. The storage application server 105 includes any storage service related components configured or adapted to provide storage services (e.g., storage as a service) to a variety of backup servers 101 using any access protocols as is known in the art. For example, the storage application server 105 may include backup logic 121 and restore logic 122. The backup logic 121 is configured to receive requests to back up data from a backup server 101 and to report to the backup server 101 whether the backup operation from the source storage system to the target storage system 104 was successful or unsuccessful. Restore logic 122 is configured to retrieve and restore backup data from target storage system 104 back to source storage system 180 and to report the successful or unsuccessful restoration of the backed up data to backup server 101. The storage application server 105 can also include a second backup agent 184B, which works with the first backup agent 184A to provide an improved backup workflow for one or more file sharing protocols (e.g., SMB, CIFS, Samba, etc.) being implemented by file server 150. In one embodiment, the storage application server 105 may be integrated with the backup server 101 as a single server or cluster of servers.

In one embodiment of the storage system 100, backup logic 121 on the storage application server 105 is configured to receive requests from the backup server 101 to backup stored data or to replicate stored backup data. The backup logic 121 can report the successful or unsuccessful storage or replication of the backed up data to the target storage system 104. In one embodiment the backup server 101 directs the continuous backup of data from the source storage system 180 via a journaling mechanism that duplicates write operations to the storage system to a remote copy of the source storage system 180. Writes performed to the source storage system can be automatically replicated to the target storage system 104 over the network 103. The journaling can be performed by the first backup agent 184A, which can store write I/O activity to a journal that is stored in associated with the disk file(s) 186 on the source storage system 180. A remote journal can also exist on the target storage system 104. The remote journal can be used to apply write I/O activity to a remote replica of the disk file(s) 186.

As shown in FIG. 1, the to-be-backed-up data (e.g., data objects 112 and metadata 110) resides at the source storage system 180, which includes file server 150 that is implementing a network file sharing protocol such as, but not limited to, the SMB protocol. The first backup agent 184A receives the request from the second backup agent 184B and directs snapshot creation logic 181 to create a snapshot of to-be-backed-up data. In response to the snapshot being created, file server 150 provides the snapshot to target storage system 104 for storage.

Note that some or all of the components as shown and described may be implemented in software, hardware, or a combination thereof. For example, such components can be implemented as software installed and stored in a persistent storage device, which can be loaded and executed in a memory by one or more processors that, in response to instructions within the software, are configured to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Deduplication File System

Figure 2:
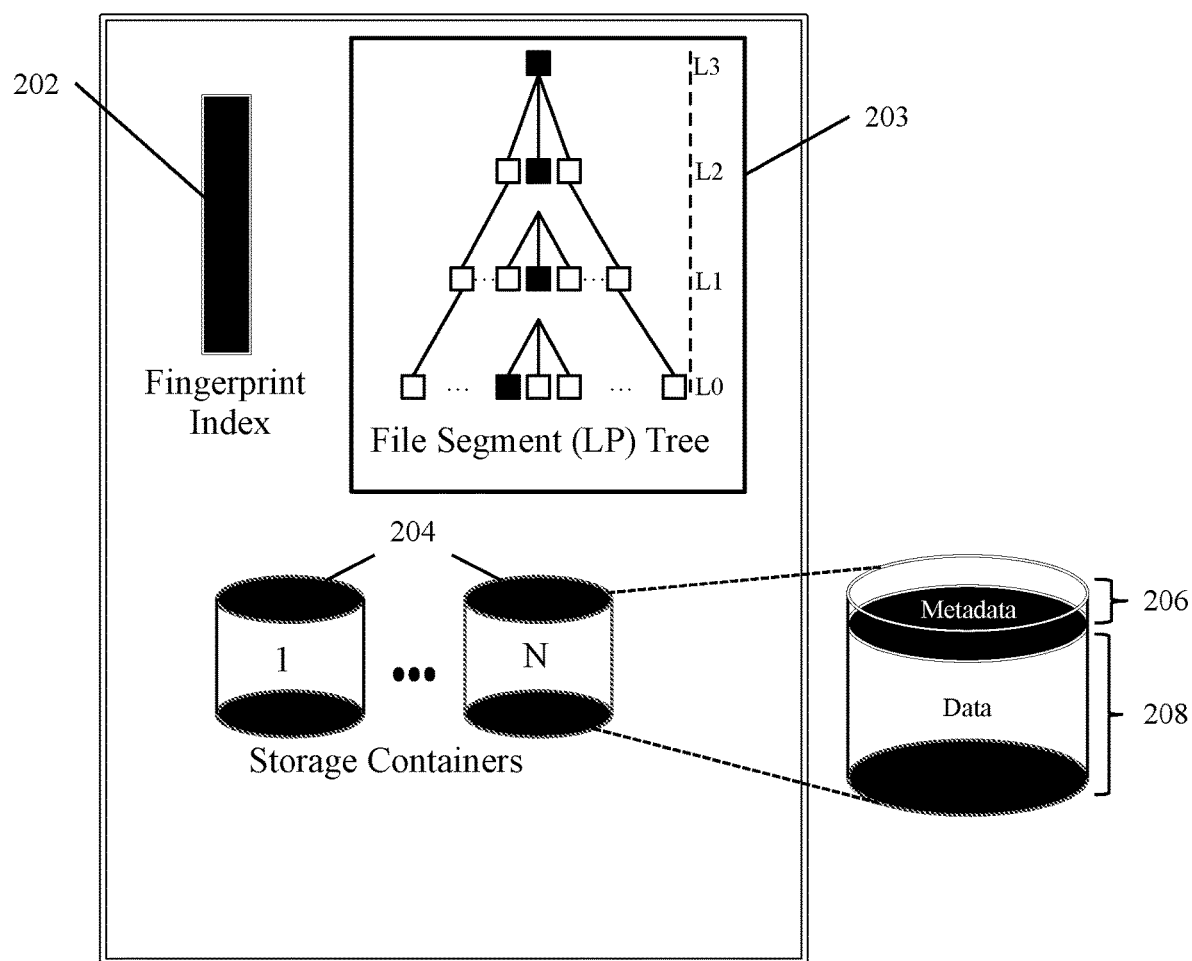
FIG. 2 illustrates a deduplication file system, according to an embodiment.

FIG. 2 illustrates a deduplication file system 200, according to an embodiment. The deduplication file system includes a fingerprint index 202, a file segment tree 203, and one or more storage containers 204 including metadata 206 and data 208. In one embodiment the fingerprint index 202 is a portion of the metadata 206 on the storage containers 204 and at least a portion of the fingerprint index 202 is stored or cached in memory. The fingerprint index 202 stores information to determine which of the storage containers 204 on which data referenced by a fingerprint is stored. In one embodiment the fingerprint index 202 stores fingerprint data in the form of fingerprint and container identifier pairs (e.g., <FP,CID>) which associate a fingerprint with a container identifier storing the storage segment associated with the fingerprint.

The file segment tree 203 is a portion of the metadata 206 that enables the deduplication file system 200 to reconstruct a file from the underlying data 208. The file segment tree 203 may be referred to as an LP segment tree. In one embodiment the file segment tree 203 is a Merkle tree that may have multiple levels depending on the size of the file. The level zero (L0) segments of the tree are segments with user data. Each L0 segment is identified by a fingerprint, which is one of the fingerprints stored in the fingerprint index 202. The fingerprints are content based fingerprints, such as a hash of the L0 data segment. A level one (L1) segment references one or more L0 segments via content based fingerprints. One or more L1 segments can then be referenced by a level 2 (L2) segment, up to the root node of the tree. Accordingly, the L0 segments contain the data 208 within the storage containers 204. In some embodiments segments in layers L1 and up, referred to as LP segments are also stored in the data 208 and each LP segment also has an associated stored in the metadata 206 and in the fingerprint index 202. Segments can be shared among multiple files and in one embodiment may be compressed and packed within a compression region. Multiple compression regions may be packed into a storage container.

Deduplication Storage System

Figure 3:
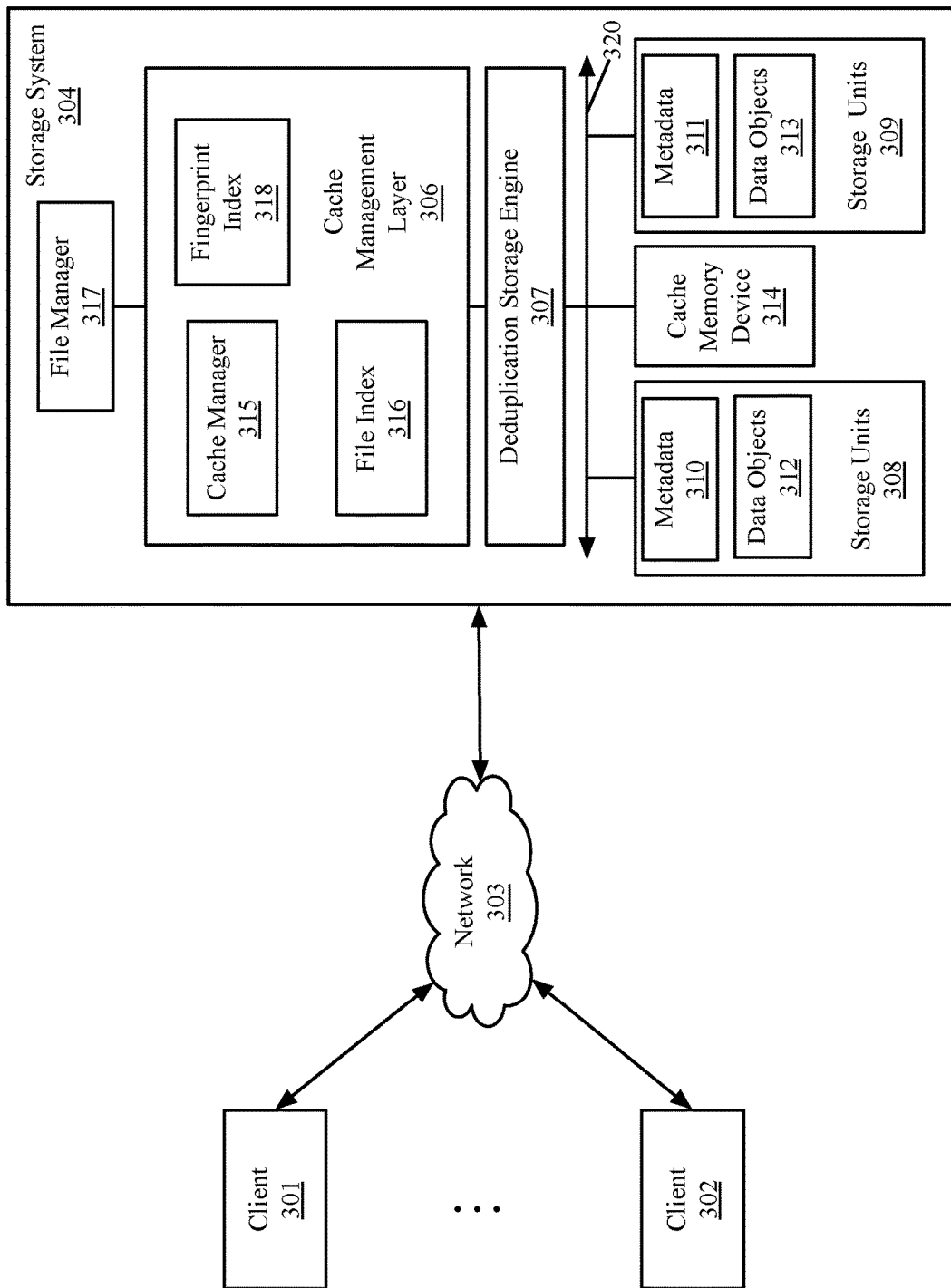
FIG. 3 is a block diagram illustrating an architecture of a storage system including a deduplication storage engine, according to an embodiment.

FIG. 3 is a block diagram illustrating a deduplication storage system 300 according to one embodiment of the invention. The deduplication storage system 300 includes, but is not limited to, one or more client systems, such as client 301 and/or client 302, which are communicatively coupled to the storage system 304 over the network 303. The clients 301, 302 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc, for which the storage system 304 is a primary storage device. Alternatively, any of the clients 301, 302 may be a primary storage system that provides storage to other local clients, which may periodically back up the content stored therein to a backup storage system, such as the storage system 304. The network 303 may be any type of networks such as a local area network (LAN), a wide area network (WAN) such as the Internet, a fiber network, a storage network, or a combination thereof, wired or wireless. The clients 301, 302 may be in physical proximity or may be physically remote from one another. The storage system 304 may be located in proximity to one, both, or neither of the clients 301, 302.

The storage system 304 may be used as any type of server or cluster of servers. For example, the storage system 304 may be a storage server used for any of various different purposes, such as to provide multiple users with access to shared data and/or to back up data (e.g., mission critical data). In one embodiment, storage system 304 includes, but is not limited to, a file manager 317, a cache management layer 306, a deduplication storage engine 307, storage units 308, 309, and a cache memory device 314 communicatively coupled to each other. The storage units 308, 309 and the cache memory device 314 may be implemented locally (e.g., single node operating environment) or remotely (e.g., multi-node operating environment) via interconnect 320, which may be a bus and/or a network (e.g., a storage network or a network similar to network 303). The storage units 308, 309 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system. The cache memory device 314 can include one or more of volatile, non-volatile, or a combination of volatile and non-volatile devices.

The file manager 317 may be executed by a processor to provide an interface to access files stored in the storage units 308, 309 and the cache memory device 314. The cache management layer 306 contains a cache manager 315, file index 316, and optionally a fingerprint index 318 (FP Index). Cache management layer 306 and file manager 317 reside in memory of a processor in one embodiment.

In one embodiment, the file index 316 is used to access data cached in cache memory device 314. The fingerprint index 318 is used to de-duplicate data stored in cache memory device 314 and the storage units 308, 309. In one embodiment the fingerprint index 318 is a partial index that covers a portion of data stored in the cache memory device and/or storage units 308, 309, with the remainder of the fingerprint data stored in the metadata 310, 311 of an associated one of the storage units 308, 309. In one embodiment, the metadata 310, 311 includes a file name, a storage unit where the segments associated with the file name are stored, reconstruction information for the file using the segments, and any other appropriate metadata information related to the files and underlying data objects on each storage unit.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of all storage units associated with the storage system in the event that the main metadata is lost, corrupted, damaged, etc. Metadata for a storage unit can be reconstructed using metadata information stored on a main storage unit or other storage unit or units (e.g., replica storage unit). Metadata information further includes index information (e.g., location information for segments in storage units). In one embodiment, metadata includes prime segment information that can be used to provide a consistent point of a file system and/or reconstruct a file system in the event of file system failure.

When data is to be stored in the storage units 308, 309, the deduplication storage engine 307 is configured to segment the file data into multiple chunks (also referred to as segments) according to a variety of segmentation policies or rules. The deduplication storage engine 307 may choose not to store a chunk in a storage unit if the chunk has been previously stored in the storage unit. In the event that the deduplication storage engine 307 does not to store the chunk in the storage unit, the deduplication storage engine 307 can store metadata enabling the reconstruction of the file using the previously stored chunk. As a result, chunks of file data are stored in a deduplicated manner as data objects 312, 313 within one or more of the storage units 308, 309. The metadata 310, 311 may be stored in at least some of storage units 308, 309, such that files and associated data objects 312, 313 in a storage unit can be accessed independently of another storage unit. In general, the metadata of each storage unit includes sufficient information to provide access to the files that are backed by the data objects 312, 313 on the storage unit.

Intelligent Data Movements Between Tiers in a Primary Storage Array

In one embodiment the storage system 304 of FIG. 3 is a primary storage system in which storage units 308, 309 are distributed across multiple storage tiers. The storage tiers can include one or more performance storage tiers in which flash storage devices or high-speed hard disk devices store data for active use by one or more clients, as well as a deduplicated storage tier which is more space efficient than the one or more performance tiers but have lower overall performance. QoS manager logic can be included to manage the storage of data on the tiers and to manager the migration of data between tiers.

Figure 4:
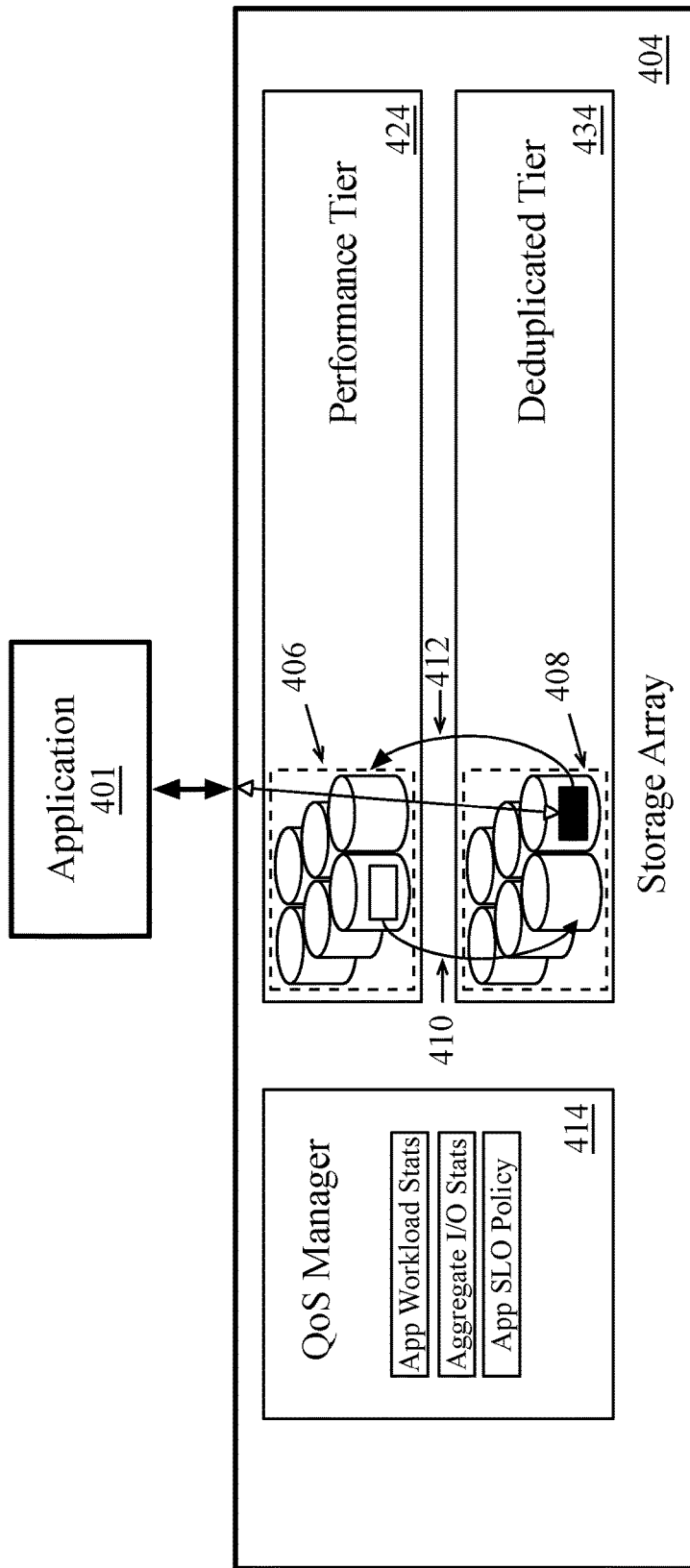
FIG. 4 is a block diagram of a storage system having multiple storage tiers, according to an embodiment.

FIG. 4 is a block diagram of a storage system 400 having multiple storage tiers, according to an embodiment. In one embodiment the storage system 400 includes an application 401 that is communicatively coupled with a storage array 404. The application 401 can be an application executing on one or more of client 301 or client 302 as in FIG. 3. The storage array 404 can be a version the storage system 304 of FIG. 3. In one embodiment the application 401 communicatively couples with the storage array 404 via a network, such as the network 303 of FIG. 3. In one embodiment the application 401 executes on a processing system within the same computing device as the storage array 404 and the application 401 communicates with the storage array 404 over an internal interface bus. In the illustrated embodiment, the storage array 404 is a primary storage device for the application 401.

In one embodiment the storage array includes a performance tier 424 and a deduplicated tier 434, although one or more instances of the performance tier 424 and/or deduplicated tier 434 may be present. The performance tier 424 includes a first set of storage devices 406, which may be high performance storage devices such as flash memory based storage devices or an array of high speed hard disk drives. In one embodiment the performance tier 424 includes multiple performance sub-tiers in which the highest performance tier is made up of the highest performing devices in the first set of storage devices 406, while other performance sub-tiers are constructed from different high performance devices in the first set of storage devices 406. For example, a first sub-tier of the performance tier 424 can include flash memory devices while a second sub-tier can include arrays of high-speed disk drives.

The deduplicated tier 434 includes a second set of storage devices 408, which can include any type of storage devices but typically includes storage devices having lower performance and higher capacity that the storage devices of the first set of storage devices 406. The second set of storage devices 408 of the deduplicated tier 434 store data in a deduplicated format after deduplication by a deduplication storage engine, such as the deduplication storage engine 307 as in FIG. 3.

In one embodiment the performance tier 424 and the deduplicated tier 434 are stored within the same computing platform and interconnected via an interface bus within the computing platform. In one embodiment the deduplicated tier 434 is stored in a separate computing platform and connected with the performance tier 424 via a network or an interconnect backplane.

In one embodiment, a QoS manager 414 manages migration between and within the performance tier 424 and the deduplicated tier 434. The QoS manager 414 allows administrators of the storage system 400 to define Service Level Objective (SLO) targets for particular applications or workloads. The SLO targets define performance (e.g., latency, throughput, etc.) targets for servicing request to the various tiers. These SLO definitions typically take into account the available performance in every storage tier within the system in terms of IOPS density (IOPS/GB) of each tier. The QoS manager 414 can consider the SLO definitions in light of app workload stats, aggregate I/O states, and App SLO policy. To maintain SLO targets, storage extents on the performance tier 424 that do not meet the access threshold to remain in the performance tier 424 can be migrated to the deduplicated tier 434. When a migration occurs, a storage extent in the first set of storage devices 406 of the performance tier 424 can be migrated 410 from the first set of storage devices 406 to the second set of storage devices 408 in the deduplicated tier 434. When migrating to the deduplicated tier 434, a deduplication process is performed in which only unique instances of the migrated data are stored in the second set of storage devices 408. If deduplicated data stored in the deduplicated tier 434 becomes 'hot' (e.g., frequently accessed), the data can be migrated 412 to the performance tier 424. When migrating to the performance tier 424 from the deduplicated tier 434, a rehydration process occurs in which deduplicated data may be dispersed to various locations in the first set of storage devices 406.

Figure 5A:
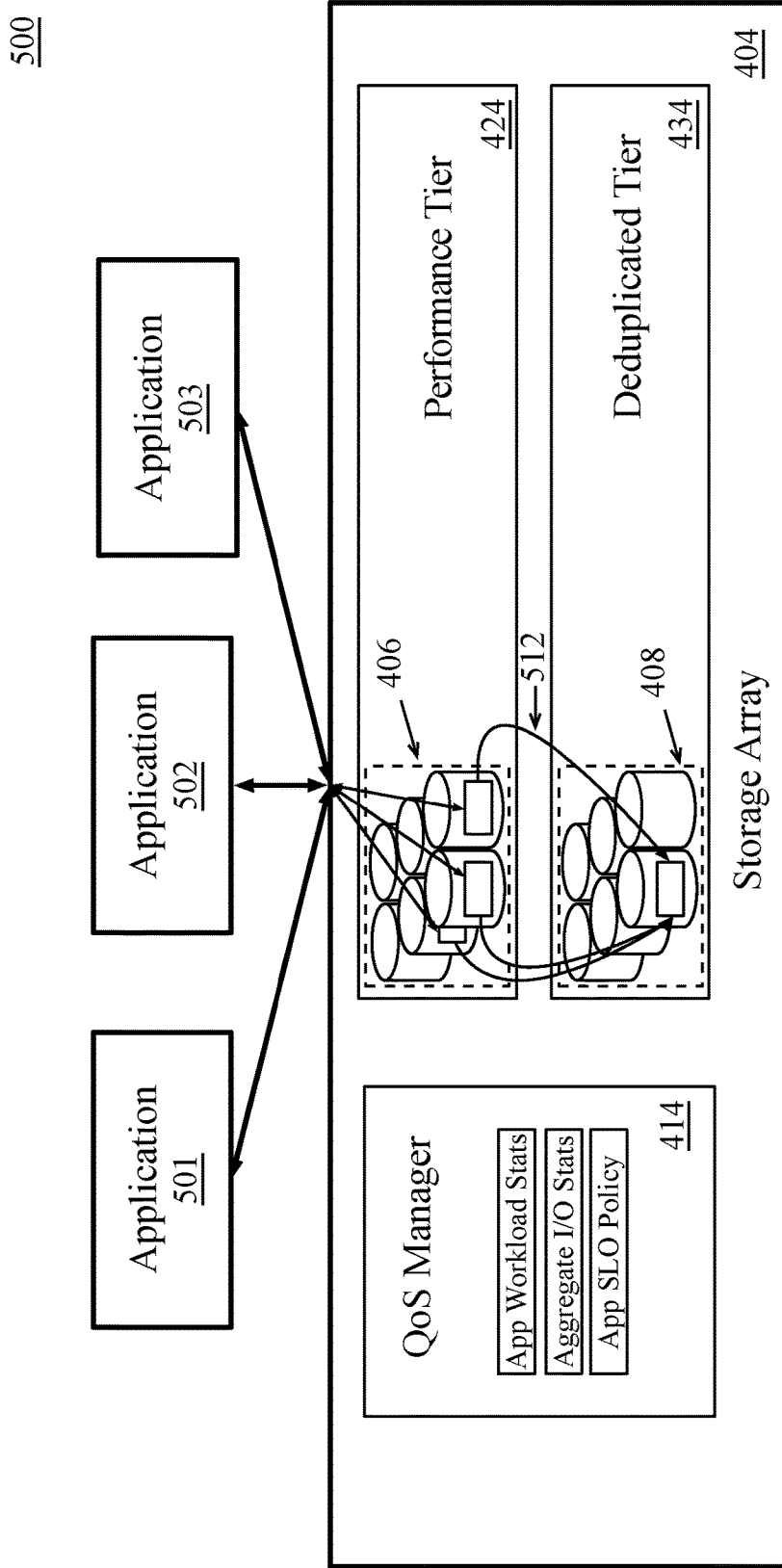
FIGS. 5A-5B are block diagrams of an additional storage system having multiple storage tiers, according to an embodiment.
Figure 5B:
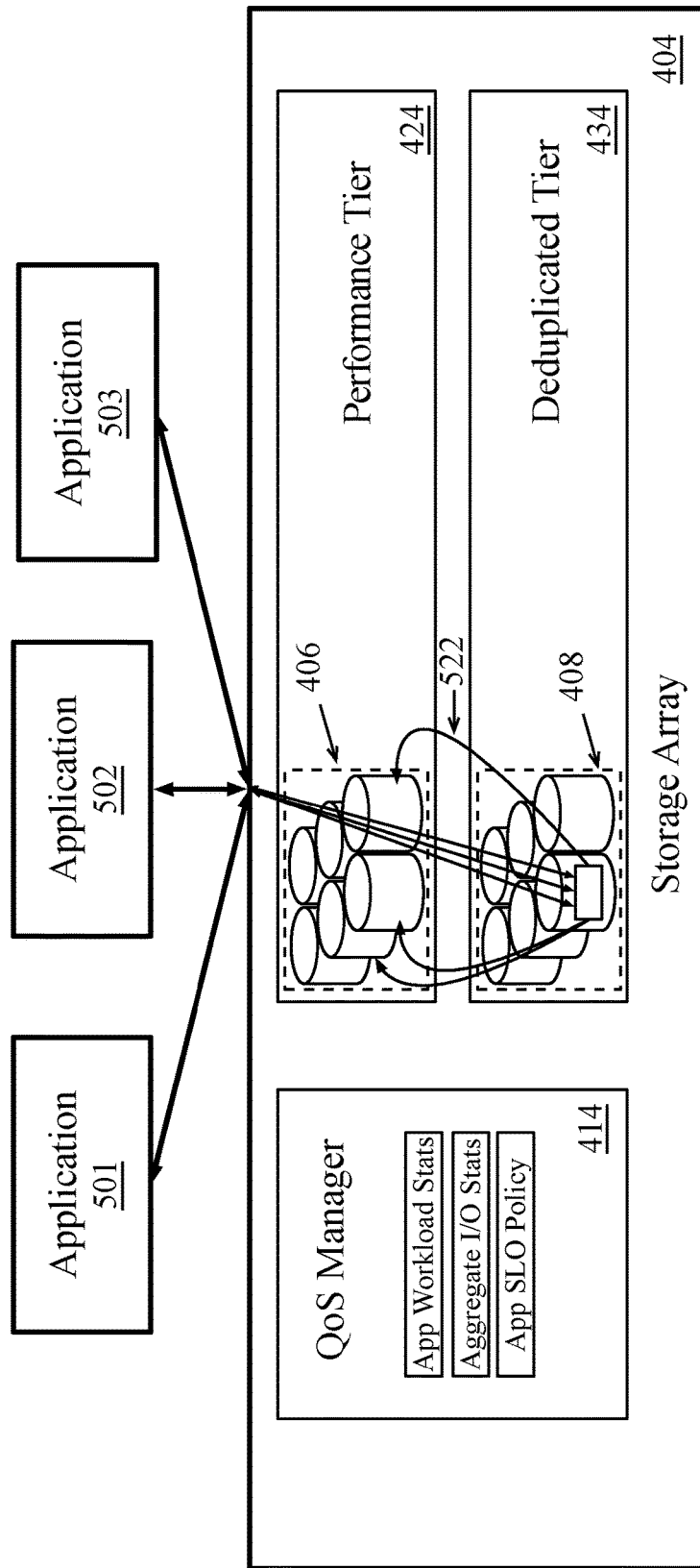

FIGS. 5A-5B are block diagrams of a storage system 500 having multiple storage tiers, according to an embodiment. FIG. 5A shows a storage system 500 including the storage array 404 of FIG. 4, where the storage array 404 is configured to provide primary storage to multiple applications (application 501, application 502, application 503). The storage system 500 illustrates a migration 512 and deduplication from the first set of storage devices 406 in the performance tier 424 to the second set of storage devices 408 in the deduplicated tier 434. The migration 512 can occur when the QoS manager 414 determines, based on app workload stats, aggregate I/O stats, and application SLO policy that the extents in the first set of storage devices 406 have an access frequency below a threshold for the performance tier 424. The migration 512 and deduplication causes a distributed set of identical storage extents to be deduplicated into a single storage extent that is stored on the second set of storage devices 408.

FIG. 5B shows the storage system 500 after the migration 512 of FIG. 5A. One scenario that can occur is that extents that are migrated to the deduplicated tier 434 can realize a temporary increase in access frequency, as the multiple copies of the extent that were previously distributed across multiple drives in the first set of storage devices 406 are not stored as a single extent in the second set of storage devices. Thus, the aggregate access rate of the single instance of the extent in the deduplicated tier 434 can cause the deduplicated extent to be re-migrated 522 to the performance tier 424. Once the extent is re-migrated 522 and re-hydrated, the access frequency of the now distributed instances of the extent can fall below the access frequency necessary for the QoS manager 414 to maintain the extents in the performance tier 424. The thrashing cycle of deduplication and rehydration can cause unnecessary I/O and computational overhead for the storage array.

Figure 6:
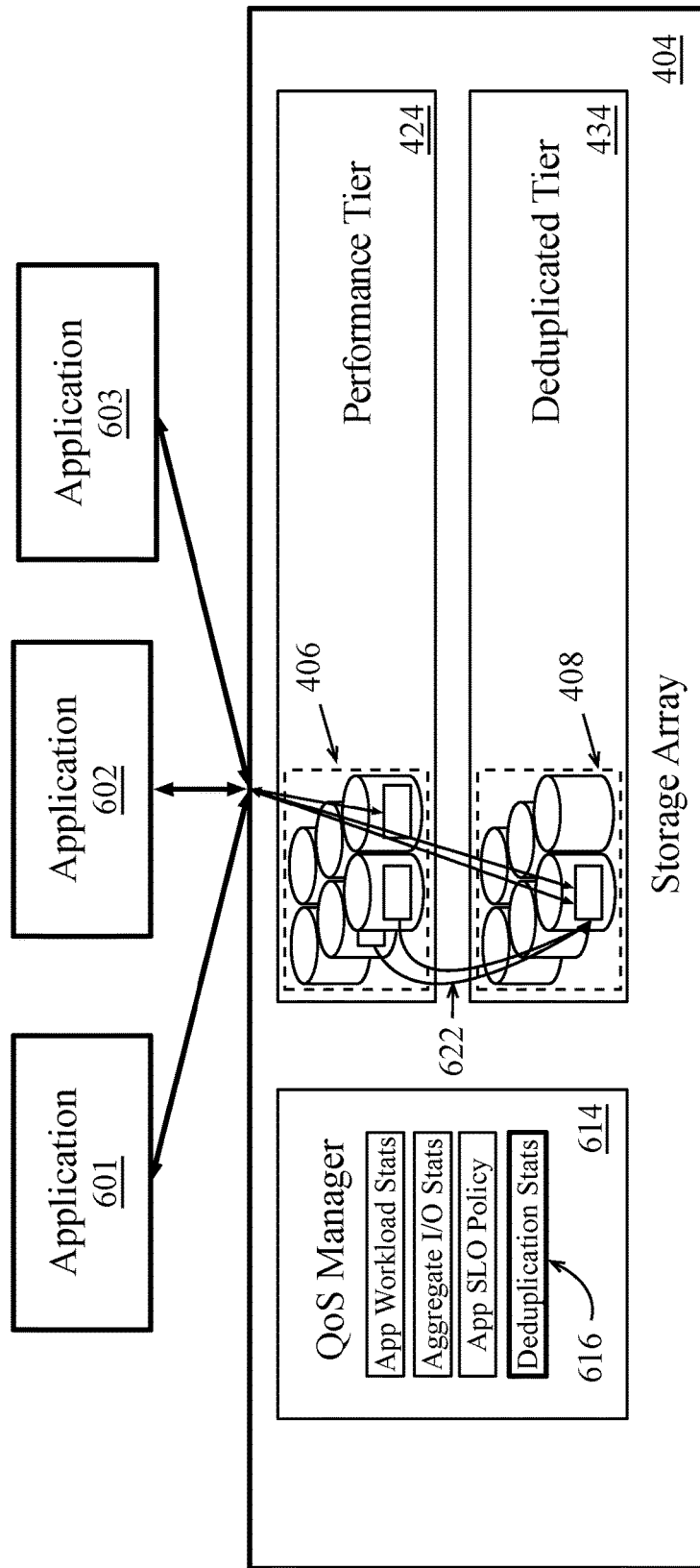
FIG. 6 is a block diagram of a storage system including an enhanced QoS manager, according to an embodiment.

FIG. 6 is a block diagram of a storage system 600 including an enhanced QoS manager 614, according to an embodiment. The enhanced QoS manager 614 can track deduplication statistics 616 that are used to reduce the amount of thrashing between the performance tier 424 and the deduplicated tier 434. The deduplication statistics 616 track the dedupability of data in the storage array 404. The deduplication statistics 616 are configured such that when data is to be moved from the performance tier 424 to the deduplicated tier 434, the impact of performance aggregation is considered prior to data movement.

By tracking deduplication statistics 616, the QoS manager 614 is able to more intelligently decide if and when an extent of data is to be moved into the deduplicated tier 434, to minimize the level of thrashing between the performance tier 424 and the deduplicated tier 434, while maintaining the performance SLO requirements for all workloads. Data mover logic within the QoS manager 614 can calculate fingerprints of candidate extents to be moved. The deduplicated tier 434 tier can provide query access to the fingerprints of data in the deduplicated tier 434. In one embodiment enabling the QoS manager 614 to query the fingerprint index of the deduplicated tier 434 provides this query access. Given the deduplication statistics 616, the "dedupability" of an extent can be calculated and included in the data move cost function that is used to determine whether or not data should be moved between tiers. The dedupability of an extent can be used to determine the aggregate I/O demand for all instances of the extent. If I/O access for an individual extent is low, but the aggregate I/O demand for such extent after deduplication is high, thrashing may occur for the extent between the storage tiers.

To avoid thrashing between the performance tier 424 and the deduplicated tier 434, the QoS manager 614 can use the deduplication statistics 616 to determine that a partial migration 622 of data from the performance tier 424 to the deduplicated tier 435 should be performed. The partial migration can be performed upon a determination that the extent to be migrated has dedupability beyond a threshold, such that the aggregate I/O activity of the deduplicated data would cause a transfer back to the performance tier 424. The partial migration 622 can include migrating and deduplicating less than all instances of the extent to the deduplicated tier 434, while leaving one or more instances of the extent in the first set of storage devices 406 in the performance tier 424 to service access requests from one or more of the applications (application 601, application 602, application 603).

In one embodiment the migration determination is performed to maintain a balance between the performance SLO requirements for all workloads while minimizing the amount of thrashing between tiers. Before an extent is to be migrated, the QoS manager 614 can compute a migration cost for the extent. This migration cost considers the I/O cost of the data move, as well as the computational cost of deduplication or rehydration. Based on the calculated migration cost, the QoS manager 614 can cause the partial migration 622 of the extent. The storage array can then be configured such that one or more applications (e.g., any one or more of application 601, application 601, and/or application 601) continue to access the extent from a performance tier 424, while one or more applications are configured to access the extent from the deduplicated tier 434.

Figure 7:
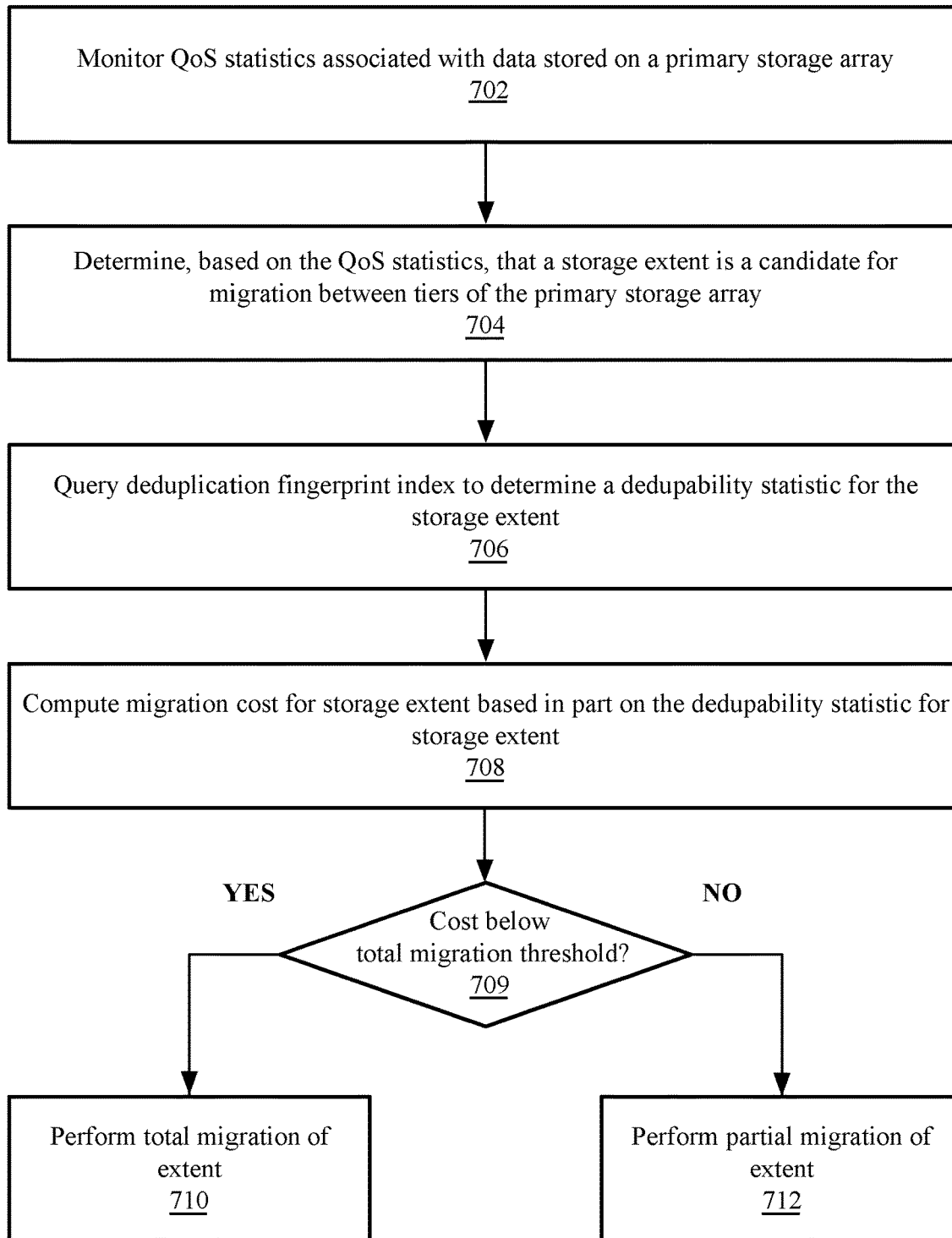
FIG. 7 is a flow diagram illustrating logic to perform intelligent data movements between tiers in a primary storage array, according to an embodiment.

FIG. 7 is a flow diagram that illustrates logic 700 to perform intelligent data movements between tiers in a primary storage array, according to an embodiment. In one embodiment the logic 700 is included in data movement logic within a QoS manager, such as the QoS manager 614 of FIG. 6. The logic 700 can monitor QoS statistics associated with data stored on a primary storage array, as shown at 702. The logic 700 can then determine, based on the QoS statistics, that a storage extent is a candidate for migration between tiers of the primary storage array, as shown at 704. In one embodiment the QoS statistics include application workload statistics, aggregate I/O statistics, and deduplication statistics. These statistics can be analyzed in terms of application SLO policies that define service level objectives for various applications based on the performance tier associated with the application.

The application SLO policies can define different performance level objectives for a given application. For example, an application can be slotted into one of various levels of performance tiers that define the technology with which the applications requests will be serviced. At the highest performance tier, application storage can be provided via the highest level of technology available on the storage system, such as one or more variants of semiconductor memory storage (e.g., flash, SSD, etc.). Successively lower performance tiers can be serviced using lower performance and lower cost technologies, such as lower cost semiconductor memory devices, high speed/low latency hard disk drives, or hybrid storage arrays. Lower performance tiers can be serviced by lower speed hard disk drives, and the lowest level of performance can be provided by lower speed hard disk drives with deduplication enabled, to enhance storage efficiency at the expense of lower performance.

Based on the application SLO policies, the logic 700 can determine at block 704 that that a storage extent is a candidate for migration because the frequency of I/O access to the extent (e.g., heat) is too low to justify the storage cost of maintaining the extent in a performance tier. Alternatively, the logic 700 can determine at 704 that the heat of an extent is too high to justify maintaining the extent in a lower performance tier. In one embodiment, the deduplication statistics for an extent are considered to determine a migration cost for the extent. The deduplication statistics are relevant for several reasons, including, but not limited to determining the computational cost associated with the deduplication process for an extent, which can include the cost of deduplication and the cost of a subsequent re-hydration.

In one embodiment, determining deduplication statistics can be performed by performing at least a partial deduplication for an extent and querying a deduplication fingerprint index to determine dedupability statistics for the storage extent, as shown at 706. The partial deduplication for the extent can include computing fingerprints for data within the extent and determining an amount of duplicate data within the extent. In one embodiment, the logic 700 can determine the amount of duplicate instances of data within the extent across the current storage tier. If, for example, the extent has a high deduplication ratio, the computational cost to fully deduplicate the extent will be high, even if the I/O cost to deduplicate the extent will be lower. Additionally, an extent with a high deduplication ratio may have an aggregate I/O access rate that can cause the extent to be re-hydrated.

Based on such information, the logic 700 can compute a migration cost for the storage extent, which is based in part on the dedupability statistic for the storage extent, as shown at 708. The migration cost can include the cost in I/O resources, computational resources, and the likelihood of whether a full migration will cause the extent to thrash between performance tiers. The migration cost can factor whether the aggregate I/O access rate for the extent after deduplication will exceed the ratio required to cause a subsequent promotion and re-hydration of the extent from deduplicated storage. The migration cost can also factor whether a promotion of an apparently hot extent from a deduplicated tier to a performance tier would cause the aggregate I/O access rate for the re-hydrated extents to fall below the threshold required to maintain the extents in the performance tier.

If the logic 700 is to determine, as shown at 709, that the migration cost for an extent is below a total migration threshold, the logic can perform a total migration of the extent at 710. This process includes deduplicating or re-hydrating an extent and completely migrating the extent between deduplicated and non-deduplicated storage tiers. The total migration at 710 would be performed if the migration cost suggests that the total balance of performance and storage efficiency of the primary storage system would benefit from the migration. The total migration for the extent can be performed as illustrated in FIGS. 5A-5B.

If the logic 700 determines at 709 that the cost is above the total migration threshold, the logic 700 can perform a partial migration of the extent at 712. This partial migration can include deduplicating and migrating some instances of the extent to the deduplicated storage tier while maintaining one or more instances of the extent in a performance tier. The partial migration for the extent can be performed as illustrated in FIG. 6, in which a partial migration (e.g., partial migration 622) is performed. The storage array can then be configured such that one or more applications continue to access the extent from a performance tier, while one or more applications are configured to access the extent from the deduplicated tier. While FIG. 6 illustrates a partial migration from a performance tier to a deduplicated tier, in one embodiment, partial migrations can also be performed from a deduplicated tier to a performance tier, in which an extent is partially re-hydrated without fully migrating the extent from the deduplicated tier to the performance tier.

Based on the systems and process logic described above, embodiments can be configured to enable intelligent data movements between tiers in a primary storage array. The primary storage array described herein includes at least some aspects of a secondary storage array in that a deduplicated tier is provided which stores data at high storage efficiency, although access to the deduplicated data is maintained via the primary storage system. Deduplication statistics can be maintained for storage extents stored on the primary storage array. These deduplication statistics can be used to determine the degree to which an extent will be migrated between tiers in the storage array.

One exemplary embodiment of the storage system described above provides a data storage system including a storage array including a first set of storage devices and a second set of storage devices. The first set of storage devices provides storage for a performance tier of the storage array. The second set of storage devices provides storage for a deduplicated tier of the storage array. One or more performance tiers may be provided, and the level of performance provided by the performance tier can be determined based on a mix of the storage technology and the configuration of the storage technology (e.g., type of semiconductor memory, RAID configuration of the storage devices, etc.). In one embodiment a performance tier and a deduplicated tier may include similar technology, but deduplication enables a higher level of storage efficiency at the expense of lower performance.

The exemplary storage system additionally includes a QoS manager that is configured to track deduplication statistics, as well as application workload statistics and aggregate I/O statistics. The statistics are tracked in service of an application SLO policy. In one embodiment the deduplication statistics characterize the dedupability of a storage extent, which can be determined in part based on a query to a deduplication fingerprint index for the deduplication tier. The deduplication fingerprint index can be used to determine a deduplication ratio for an extent, which can be factored into the migration cost for migrating an extent between tiers. In one embodiment, a partial migration can be enabled between tiers to maintain the performance SLO requirements for all workloads while minimizing the amount of thrashing between tiers.

Including Workload Aggregation Statistics to Improve Deduplicated Storage Tier Management Returning to FIG. 4, in one embodiment the storage array 404 is a virtually provisioned primary storage array in which the first set of storage devices 406 and the second set of storage devices 408 are physical devices that back virtual storage devices that are presented to the application 401. Virtual provisioning is designed to simplify storage administration by allowing storage administrators to meet requests for capacity on-demand. Virtual provisioning gives a host, application or file system the illusion that it has more storage than is physically provided. Physical storage is allocated only when the data is written, rather than when the application is initially configured.

Ignoring snapshots, a virtually provisioned primary storage array generally maintains a one-to-one correspondence between virtual storage tracks on virtual storage devices and physical storage tracks on physical storage drives. A deduplicated storage tier (e.g., deduplicated tier 434) breaks this assumption by removing all duplicate tracks in the deduplicated storage tier. While improving storage efficiency, removing all duplicate tracks also aggregates performance requirements for each deduplicated track because the Input/Output Operations per second (IOPS) density of a storage tier is fixed and grows linearly with storage capacity. Because the level of deduplication present in the tier will directly affect the amount of remaining IOPS capacity in the tier, what may appear to be a cold track when located in the non-deduplicated tiers can become hot when aggregated with all other copies in the deduplicated tier.

While other embodiments described herein can solve these issues in part using intelligent QoS management logic, such as in the QoS manager 614 of FIG. 6, solutions can also be enabled within the management logic of the deduplicated tier. In one embodiment, management logic for a deduplicated storage tier is configured to consider the level of workload aggregation due to deduplication. The proposed methodology leverages three operations to balance the aggregate workload requirements for deduplicated tracks, the available IOPS density in a deduplicated tier, and the storage capacity and efficiency of a deduplicated tier.

First, as tracks are migrated into the deduplicated tier a decision is made to trade storage efficiency for performance. For example, if the aggregate workload requirement for a track or set of tracks would go beyond a threshold, then a copy of the deduplicated track can be made within the deduplicated storage tier.

Second, as the available IOPS density of the tier drops below a certain threshold, physical drives can be reallocated from a performance tier that utilizes the same drive technology, (e.g., 7200 RPM SAS drives) into the deduplicated storage tier, which results in an increase in the overall IOPS density of the deduplicated storage tier.

Third, the deduplicated storage tier can provide hints to the data movement service that a deduplicated track (or set of tracks) and its associated workload should be migrated back to a performance tier as a set since the aggregate performance requirement across all copies of the track is large enough to warrant it, for example, based on some SLO property. In general, the techniques described manage the storage capacity efficiency, individual track hot spots, and remaining IOPS density of a deduplicated storage tier while leveraging the knowledge of workload aggregation due to deduplication.

The use of storage tracks herein is relevant to one embodiment in which data deduplication is performed on a magnetic hard drive based storage tier. However, embodiments are configurable as to the underlying storage quantum at which deduplication is performed. Accordingly, data can be managed and deduplicated at various storage granularities including chunks, segments, pages, logical blocks, or any other unit of storage for deduplicated data. Additionally, One embodiment supports the storing deduplicated data on semiconductor memory devices, such as flash memory.

Figure 8A:
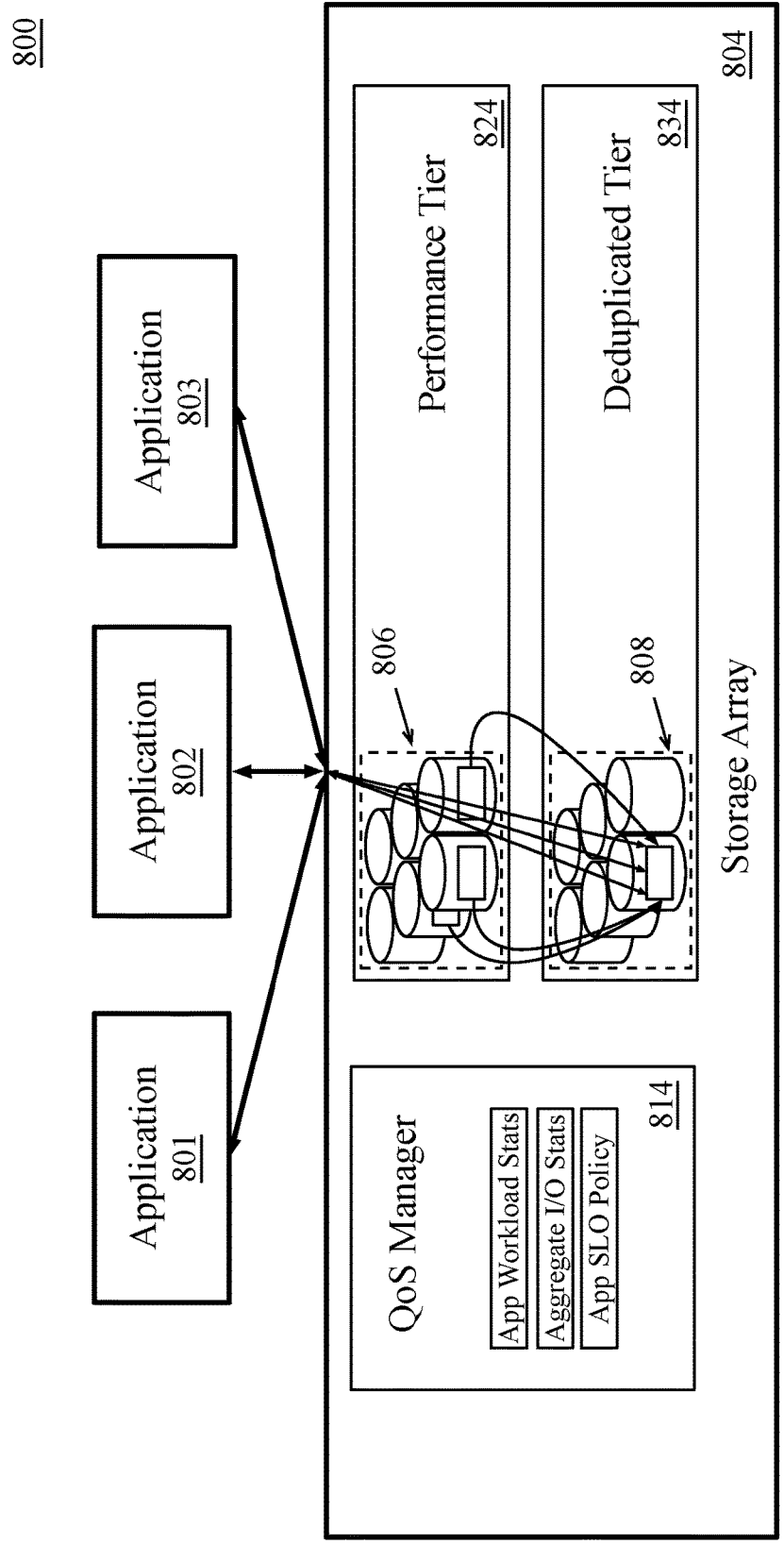
FIGS. 8A-8B are block diagrams illustrating potential deduplication related issues that can arise for management logic of a deduplicated storage tier.
Figure 8B:
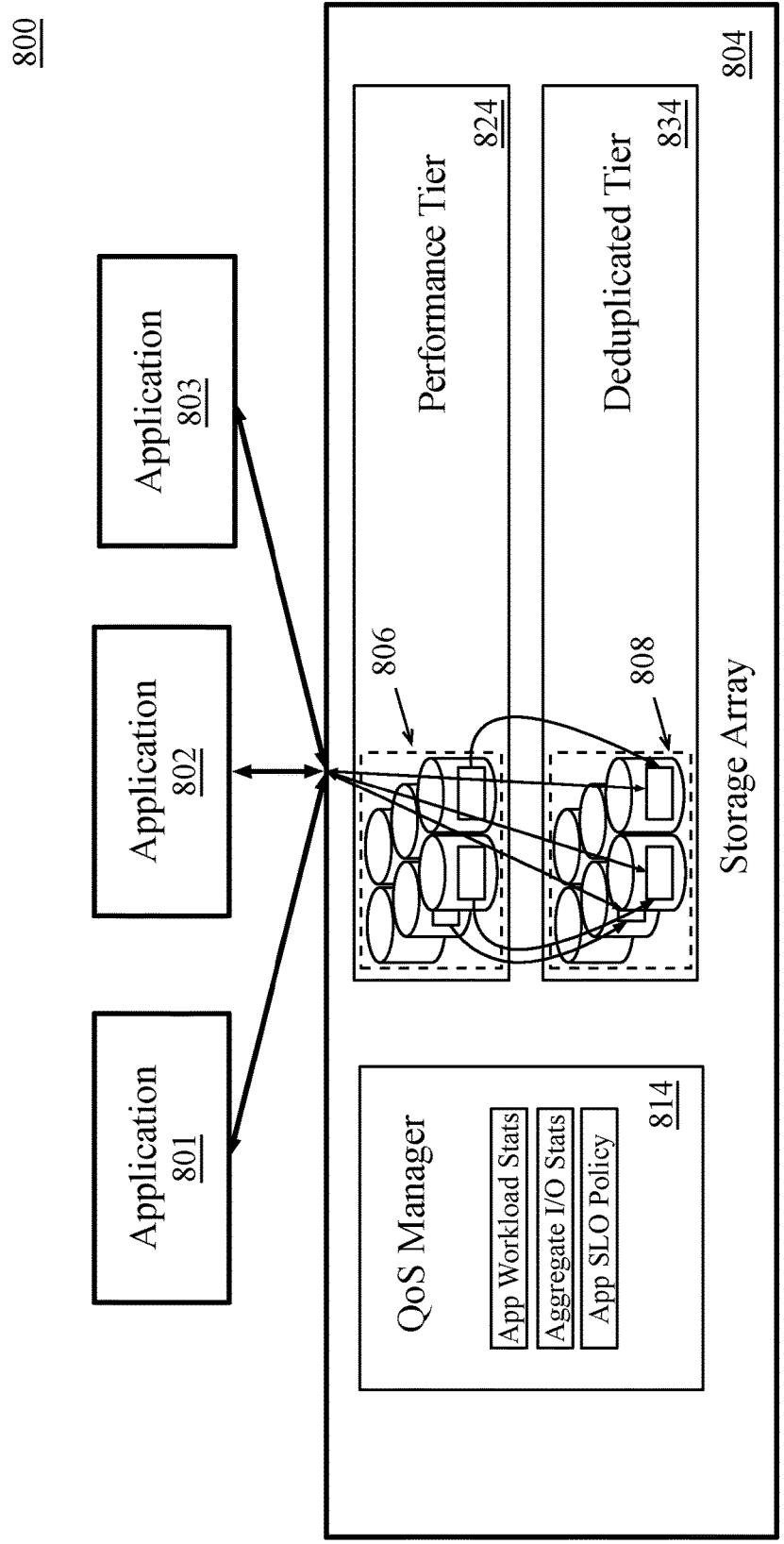

FIGS. 8A-8B are block diagrams illustrating potential deduplication related issues that can arise for management logic of a deduplicated storage tier. As illustrated, a storage system 800 includes multiple applications (application 801, application 802, application 803) connected to a storage array 804 over a network or an interface bus. The storage array 804 provides tiered storage in the form of a performance tier 824 and a deduplicated tier 834. In one embodiment the performance tier 824 includes a set of virtual storage devices that are backed by physical storage devices in a first set of storage devices 806. The deduplicated tier 834 includes a set of virtual storage devices that are backed by a second set of storage devices 808. The storage array 804 can also include a QoS manager 814, which can be similar to the QoS manager 414 of FIG. 4.

FIG. 8A shows a migration scenario in which data migrated between the performance tier 824 and the deduplicated tier 834 realizes a high degree of dedupability, resulting in a high deduplication ratio after migration. While this scenario is beneficial from a storage efficiency standpoint, storing a single instance of the deduplicated data limits the IOPS capacity for access to the extent, as the IOPS capacity for the extent is limited to the IOPS capacity of single storage device upon which the extent is stored in the deduplicated tier 834.

FIG. 8B shows a migration scenario in which data migrated between the performance tier 824 and the deduplicated tier 834 realizes a low degree of dedupability, resulting in a low deduplication ratio after migration. Due to the low deduplication ratio of the migrated data, the IOPS capacity issue illustrated in FIG. 8A does not arise. However, the storage efficiency of the migrated data is low, causing the migrated data to consume a larger amount of storage in the deduplicated tier 834.

Figure 9A:
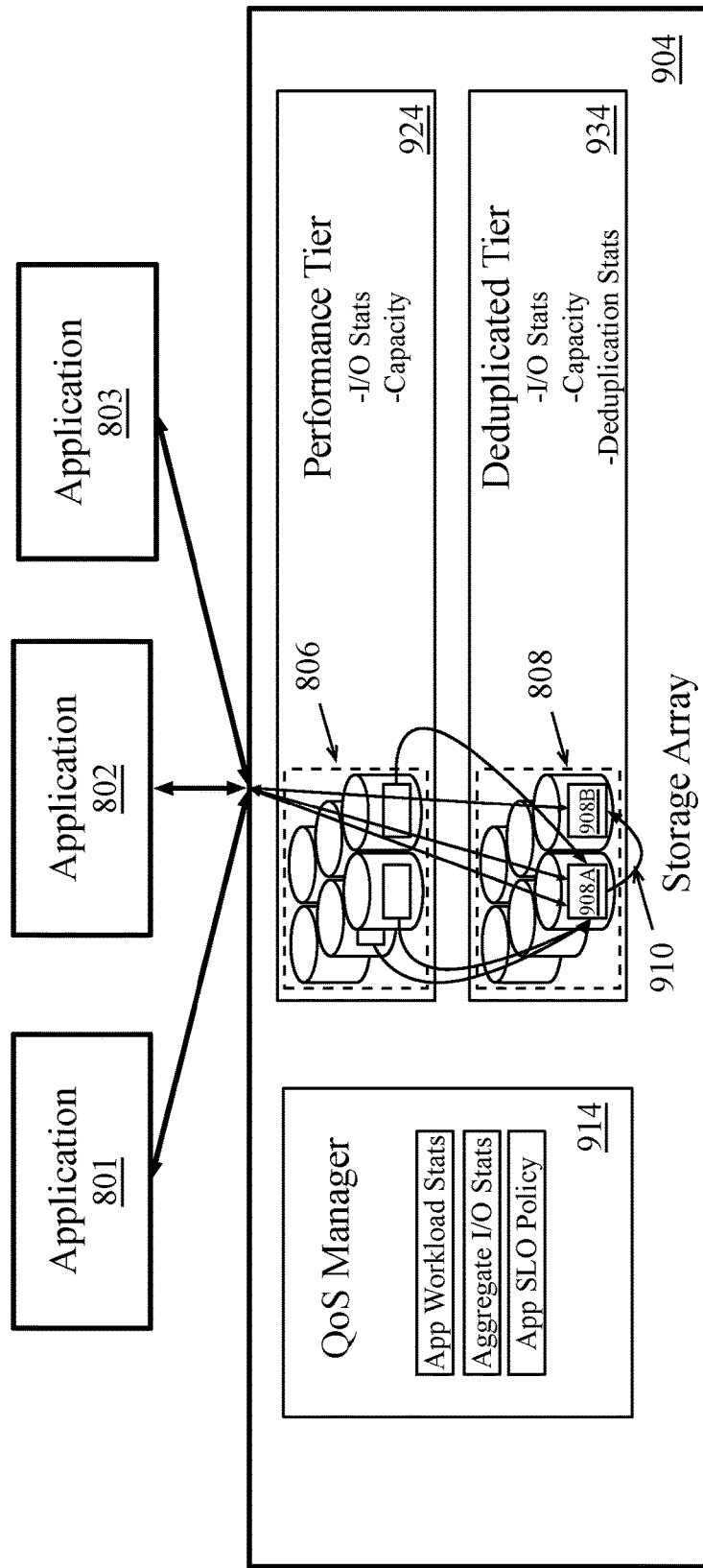
FIGS. 9A-9B are block diagrams of a storage system with improved deduplicated storage tier management, according to an embodiment.
Figure 9B:
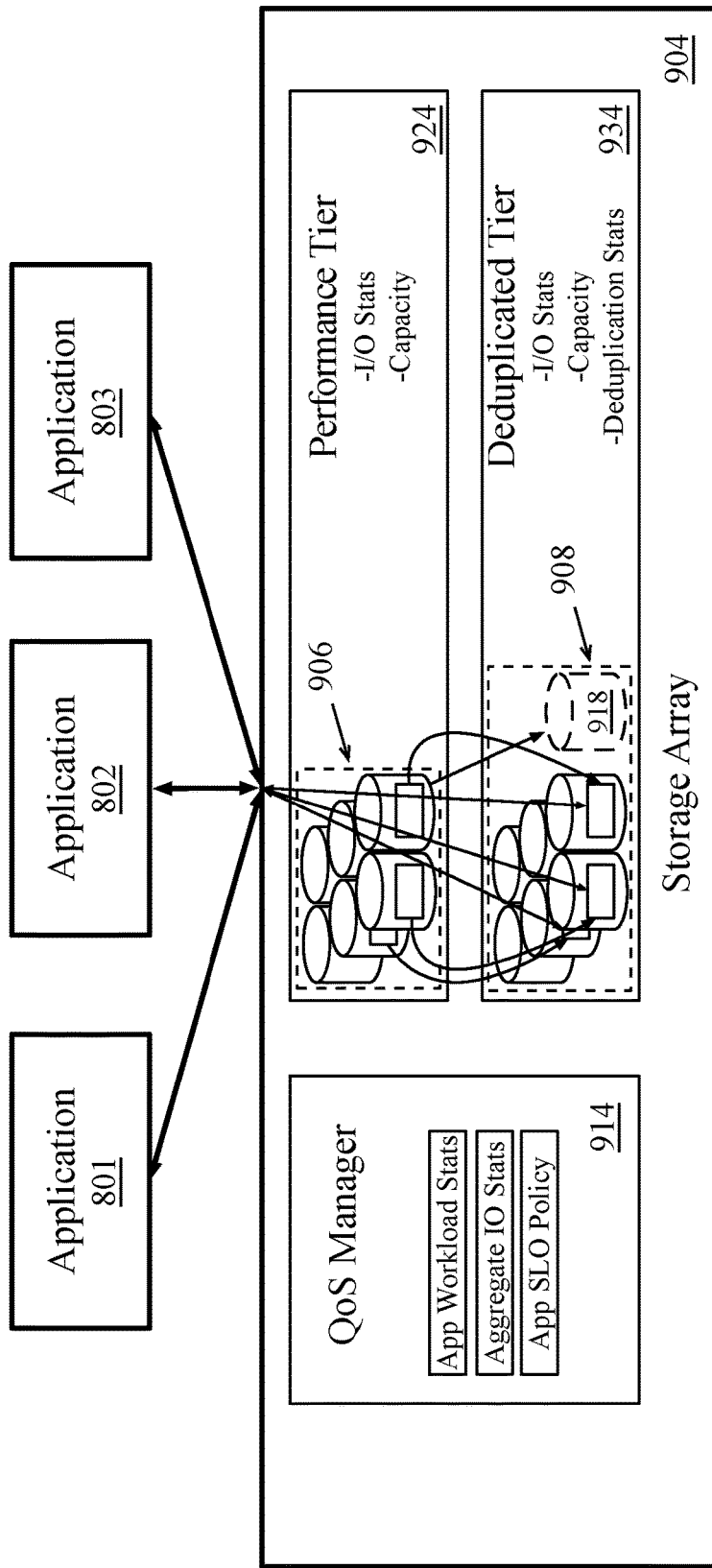

FIGS. 9A-9B are block diagrams of a storage system 900 with improved deduplicated storage tier management, according to an embodiment. The storage system 900 can service multiple applications (application 801, application 802, application 803) as in FIG. 8. The storage array 904 also includes improvements in the management logic of the performance tier 924 and deduplicated tier 934. The management logic of the performance tier 924 and the deduplicated tier 934 can actively participate in storage policy decisions in concert with the QoS manager 914. The management logic of the performance tier 924 can maintain data on I/O statistics and capacity of the first set of storage devices 806 in the performance tier. The management logic of the deduplicated tier 934 can maintain data on I/O statistics and capacity of the second set of storage devices 808 in the deduplicated tier 934, as well as deduplication statistics associated with the deduplicated data. Using this information, when data is migrated between tiers, the deduplicated tier 934 can consider the aggregate I/O statistics of the storage tracks storing the migrated extents and make a storage determination for migrated data that balances storage efficiency and performance for the migrated extents.

As illustrated in FIG. 9A, in one embodiment if the aggregate workload requirement for a physical track or set of tracks storing a deduplicated extent would go beyond a threshold, management logic for the deduplicated tier 934 can perform a copy operation 910 on the track 908A storing the deduplicated extent to create a duplicate instance of the track 908B. The multiple tracks 908A-908B storing the deduplicated extent reduce the storage efficiency of the deduplicated tier 934 with respect to the deduplicated extent. However, the use of multiple underlying instances of the data can relieve IOPS capacity pressure that may result if the deduplicated instance has only a single backing track on physical storage, improving the access performance for deduplicated data when performance is limited due to IOPS capacity. Virtualization logic for the storage array 904 can divide access requests across the multiple tracks 908A-908B storing the deduplicated extent. In such embodiment, one or more access requests to a deduplicated storage extent can be serviced by track 908A, while one or more access requests can be serviced by track 908B.

The level of track duplication can be managed by the management logic of the deduplicated tier 934. In one embodiment the track duplication is performed without making such duplication visible at the level of the performance tier 924 or the QoS manager 914, although an API query can be made available in which the level of track duplication for a given deduplicated extent can be determined. The deduplicated tier 934, based on the aggregate I/O statistics associated with deduplicated extents, can dynamically manage the level of duplication, such that performance and storage efficiency can be dynamically balanced based on application workload statistics and application SLO policy.

FIG. 9B illustrates the management logic of the deduplicated tier 934 re-purposing a physical storage device from the performance tier 924. In one embodiment, as the available IOPS density of the deduplicated tier 934 drops below a certain threshold, physical drives can be reallocated from a sub-tier of the performance tier 924 that utilizes the same drive technology. For example, while one sub-tier of the performance tier 924 can utilize semiconductor memory based storage, a second sub-tier of the performance tier 924 can utilize hard disk drives (e.g., 7200 RPM SAS drives) that may use the same storage technology as the second set of storage devices 908 used for the deduplicated tier. A drive 918 having the same storage technology can be re-purposed by adjusting the virtual mapping of the second set of storage devices 908 to include the drive 918 that is re-purposed from the performance tier, such that one or more drives that physically reside in the first set of storage devices 906 are virtually provisioned to be within the second set of storage device 908.

Repurposing a drive from a sub-tier of the performance tier 924 having excess IOPS capacity to resolve a lack of IOPS capacity in the deduplicated tier 934 can result in an increase in the performance and efficiency of the storage array 904. For example, the sub-tier of the performance tier 924 sharing drive technology with the deduplicated tier 934 is likely a non-deduplicated tier having aggregate performance that is higher than the performance of the deduplicated tier 934, but having SLO performance targets lower than those of the highest performing sub-tiers of the performance tier 924. Accordingly, the excess IOPS capacity may go unused. However, re-purposing physical devices to the deduplicated tier can result in a performance improvement of the deduplicated tier without reducing the overall performance of the performance tier 924.

Figure 10:
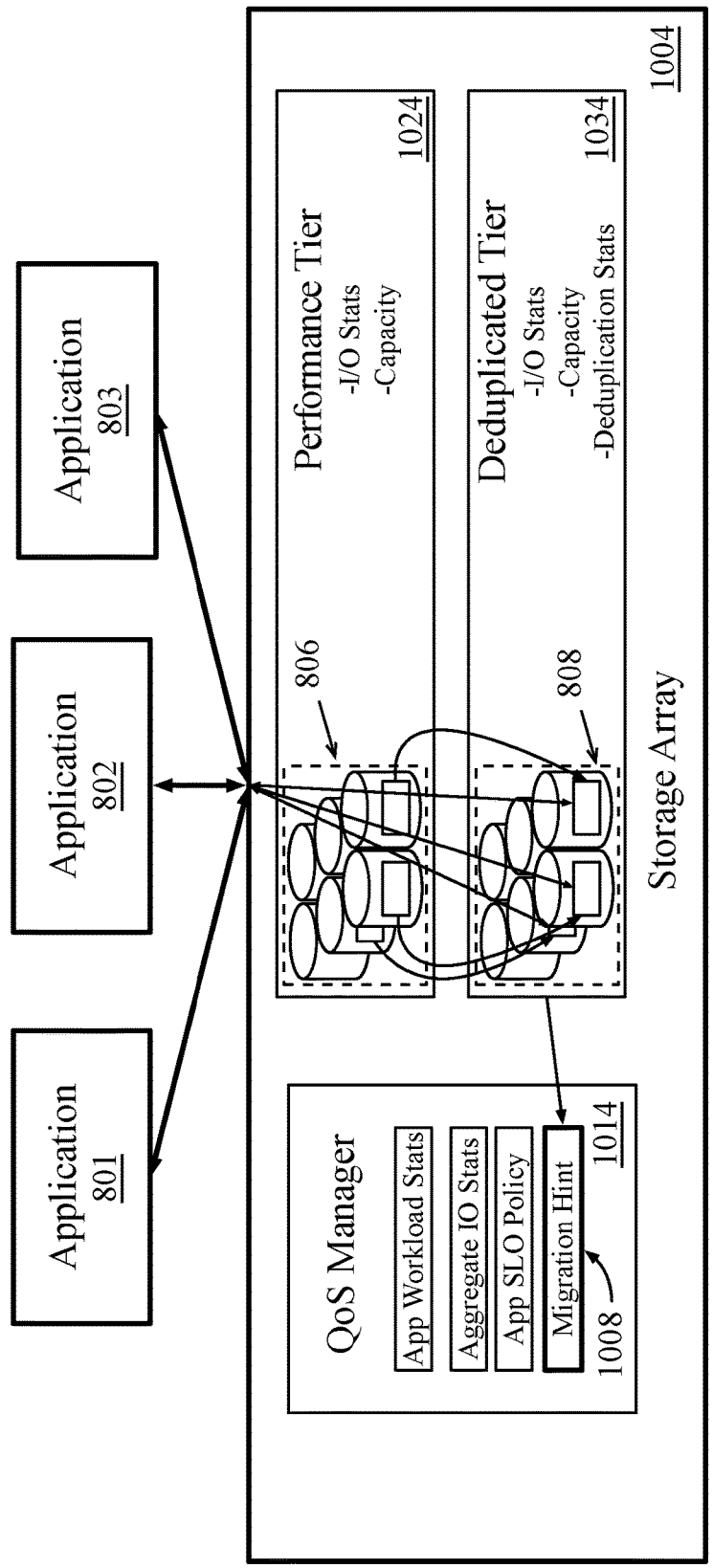
FIG. 10 is a block diagram of a storage system with improved management logic for a storage array, according to an embodiment.

FIG. 10 is a block diagram of a storage system 1000 with improved management logic for a storage array 1004, according to an embodiment. In one embodiment the storage array 1004 includes an enhanced variant of the QoS manager 1014, performance tier 1024, deduplicated tier 1034. In such embodiment, one or more of the performance tier 1024 and/or the deduplicated tier 1034 can provide hints to the QoS manager 1014. For example, the QoS manager 1014 can be configured to receive a migration hint 1008 that indicates whether a particular storage track within a tier should or should not be migrated.

For example and in one embodiment, the deduplicated tier 1034 can provide hints to the QoS manager 1014 that a deduplicated track or set of tracks and the workload associated with those tracks should be migrated back to one of the sub-tiers of the performance tier 1024. The hint can indicate that the tracks and workload should be migrated as a set, as the aggregate performance requirement across all copies of the track is large enough to warrant the migration, for example, based on one or more SLO properties.

Figure 11:
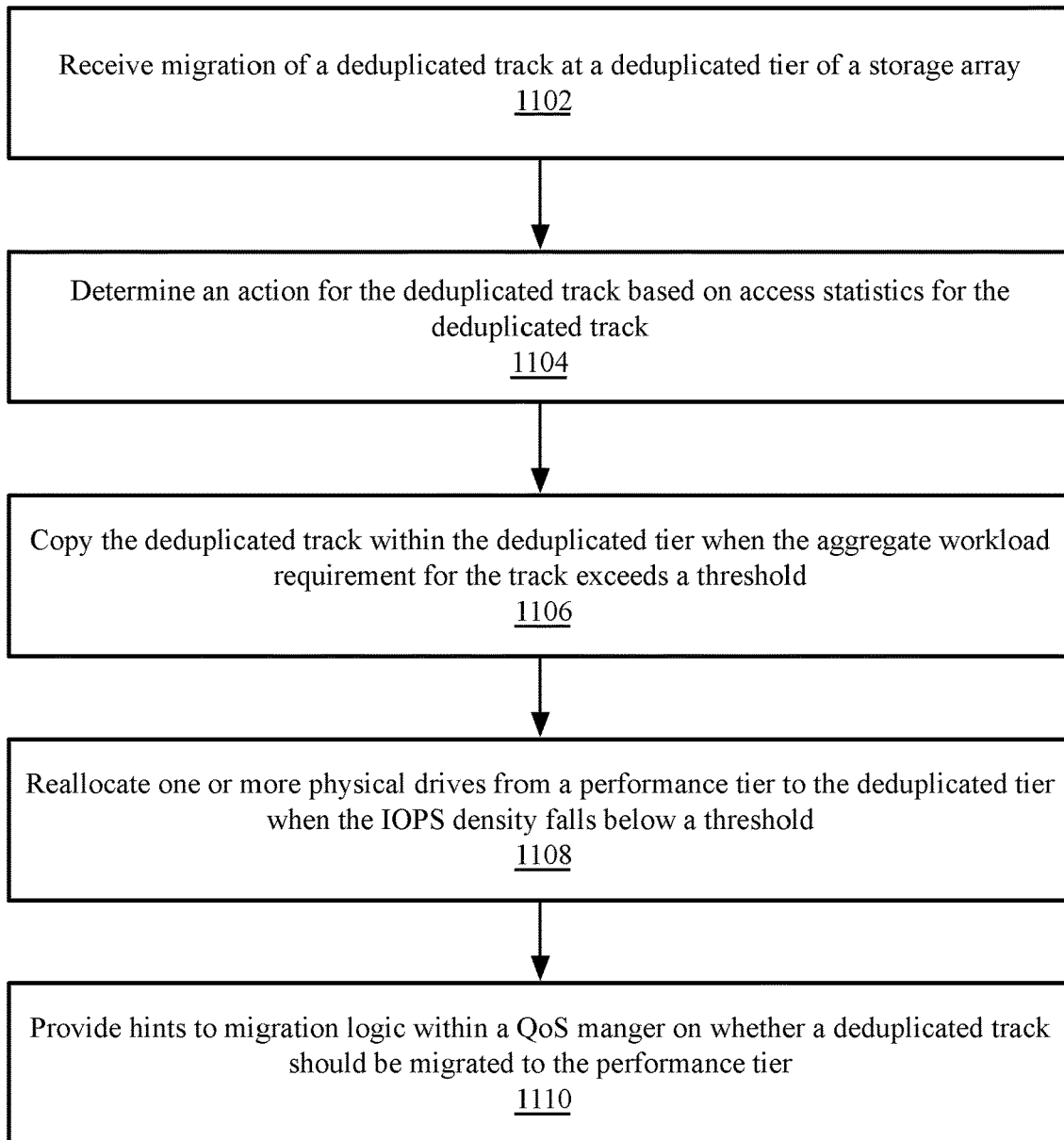
FIG. 11 is a flow diagram of logic to manage a deduplicated tier in a storage array, according to an embodiment.

FIG. 11 is a flow diagram of logic 1100 to manage a deduplicated tier in a storage array, according to an embodiment. The logic 1100 is generally configured to manage the storage capacity efficiency, individual track hot spots, and IOPS density of a deduplicated storage tier leveraging the knowledge of workload aggregation due to deduplication. The logic 1100 can work in concert with virtualization logic that manages a virtually provisioned storage array. In one embodiment the logic 1100 can receive migration of a deduplicated track at a deduplicated tier of a storage array, as shown at 1102. Receiving migration of the deduplicated track can include storing at least a portion of the deduplicated track within the deduplicated storage tier. In one embodiment, storing at least a portion of the deduplicated track includes storing a portion of the deduplicated track in a cache memory of the storage tier and/or storing a portion of the deduplicated track to a non-volatile storage medium.

The logic 1100 can then determine an action for the deduplicated track based on access statistics for the deduplicated track at 1104. In one embodiment, the logic 1100 can copy the deduplicated track within the deduplicated tier when the aggregate workload for the track exceeds a threshold, as shown at 1106. The logic 1100 can copy the deduplicated track (or set of deduplicated tracks) from a first storage device in the deduplicated tier to a second storage device in the deduplicated tier. By copying the deduplicated track or set of tracks, the IOPS capacity available to serve the deduplicated tracks is increased, resulting in a performance improvement for the deduplicated tracks at the expense of storage efficiency.

In one embodiment the logic 1100 can reallocate physical drives from a performance tier to the deduplicated tier when the IOPS density falls below a threshold, as shown at 1108. Reallocating one or more physical drives from a performance tier to the deduplicated tier can be performed when the overall performance of the storage array would be increased by such reallocation. This scenario can occur when a performance tier has sufficient I/O capacity to meet the assigned SLO requirements for the tier, while the deduplicated tier has insufficient IOPS density to meet SLO requirements for the deduplicated tier. Accordingly, one or more physical drives can be reallocated to the deduplicated tier and the storage virtualization logic can integrate the reallocated drives into the virtual storage devices of the deduplicated tier.

In one embodiment the logic 1100 can provide hints to migration logic within a QoS manager on whether a deduplicated track should be migrated to the performance tier, as shown at 1110. The hints can be provided at 1110, for example, when a deduplicated track or set of tracks and the workload associated with those tracks should be migrated back to a performance tier. The hint can be provided because the aggregate workload associated with a track exceeds a threshold based on an SLO property. The hint can be informative in circumstances in which the QoS manager tracks the access frequency of a deduplicated track without regard to the deduplication statistics associated with such track. Instead of requiring the QoS manager to track such data, the logic 1100 for the deduplicated tier can track the deduplication statistics in conjunction with the workload associated with a deduplicated track and provide hints that the QoS manager can use to determine which tracks are to be migrated to a performance tier.

Based on the systems and process logic described above, embodiments can be configured to enable improved deduplicated storage tier management by including workload aggregation statistics. One embodiment provides for a primary storage array in which management logic for a deduplicated storage tier tracks workload aggregation statistics for deduplicated storage tracks associated with deduplicated extents that are stored within the set of storage devices that make up the deduplicated tier. The management logic can determine an action for the deduplicated track based on access statistics for the deduplicated track and perform various operations based on the I/O statistics and workload statistics associated with the deduplicated track, including copying the deduplicated track within the deduplicated tier, reallocating one or more physical drives from the performance tier to the deduplicated tier, or providing hints to migration logic within a QoS manager on whether a storage track should be migrated to a storage tier.

Resource Allocation for Primary Storage Systems with Virtualized Embedded Data Protection In implementations of virtualized storage environments known in the art, system resources such as processor and memory resources are allocated statically between the storage/data services and embedded applications executing within virtual machines to avoid resource contention between data services and guest OS applications. Such static allocations assume a fairly consistent performance profile for applications executing with a guest OS. Modern data protection storage systems, such as Data Domain protection system provided by Dell EMC® of Hopkinton, Mass. can have a performance profile that depends directly on the amount of redundancy in the ingested data. Such performance profile can be characterized as computationally intensive or I/O intensive depending on the dedupability of the ingested data stream. Such scenario poses a problem when resources in a virtual array, such as a VMAX virtual array, are statically allocated. For example, some workloads within a guest OS may require different amounts of processing and/or memory resources to be allocated between the two portions of the system (e.g., guest-side and data services/storage side) in order to optimize performance.

To alleviate such issues, one embodiment provides a virtual environment that enables the dynamic reallocations of resources between guest and the storage data services. To avoid resource assignment thrashing and to provide reasonable resource guarantees to all actors, the resource allocation will be performed at large timescale granularity. Each period of resource allocation may be referred to as an epoch. Resource allocations can be adjusted at the beginning of each epoch. To optimize resource reallocations, the guest OS can provide workload "hints" to the virtual environment manager such that the virtual array can reallocate resources appropriately at the next epoch. The length of each epoch can vary among embodiments and is not limited to any specific period of time. The length of each epoch can be pre-configured or can be dynamically adjusted based on system characteristics and/or system resource allocation balance.

In one embodiment a typical backup workload can be thought of in terms of a bimodal distribution. In some cases the backup workload is storage-intensive, such as when the backup data stream includes a large amount of unique data within the stream. In other cases the backup workload is compute-intensive, such as when the data stream includes a large amount of duplicate data. In many cases, for a single backup stream the workload bias is predictable given the current state of a stream. For example, duplicate data and unique data has a tendency to arrive in large runs. Accordingly, a guest may be able to predict whether the data stream associated with a backup workload will be compute or storage intensive based on the amount of unique data within the stream.

Figure 12A:
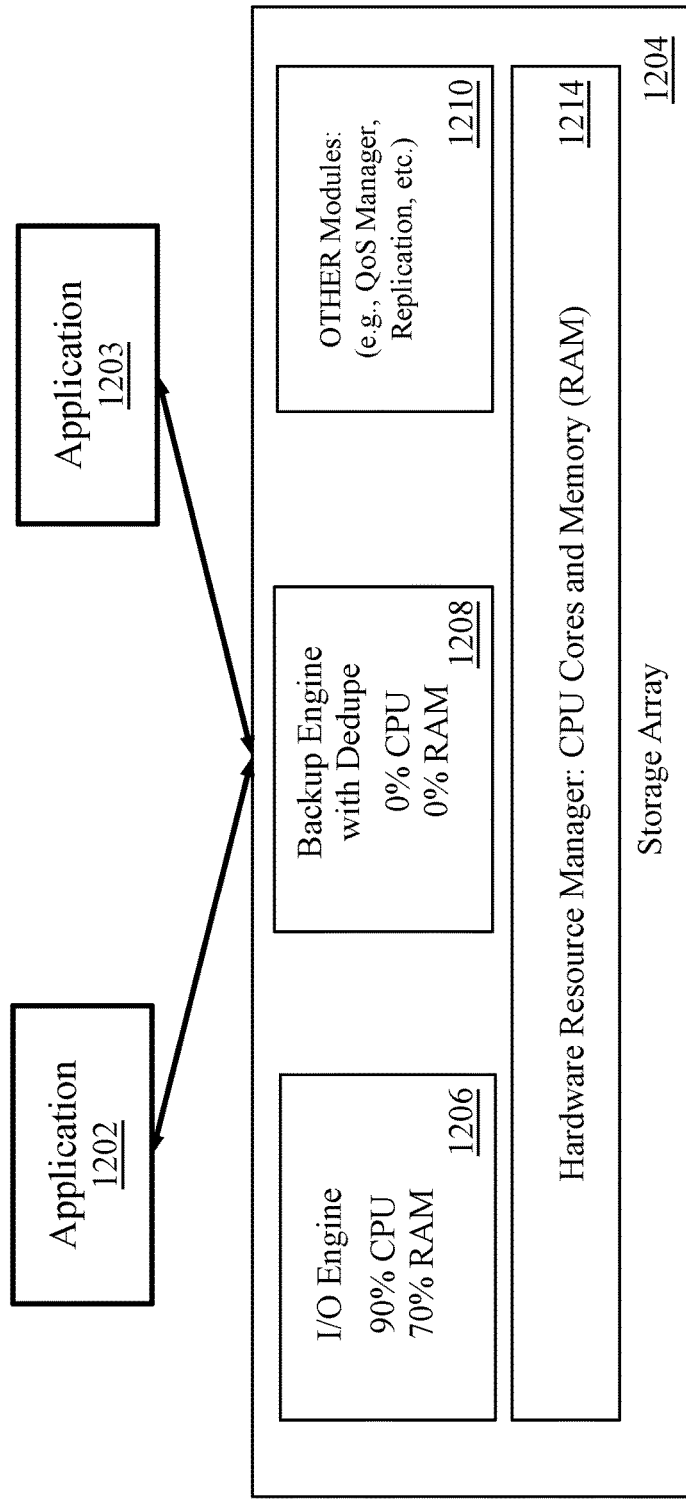
FIGS. 12A-12B are block diagrams illustrating a virtualized storage system in which I/O and compute resources can be dynamically reallocated.
Figure 12B:
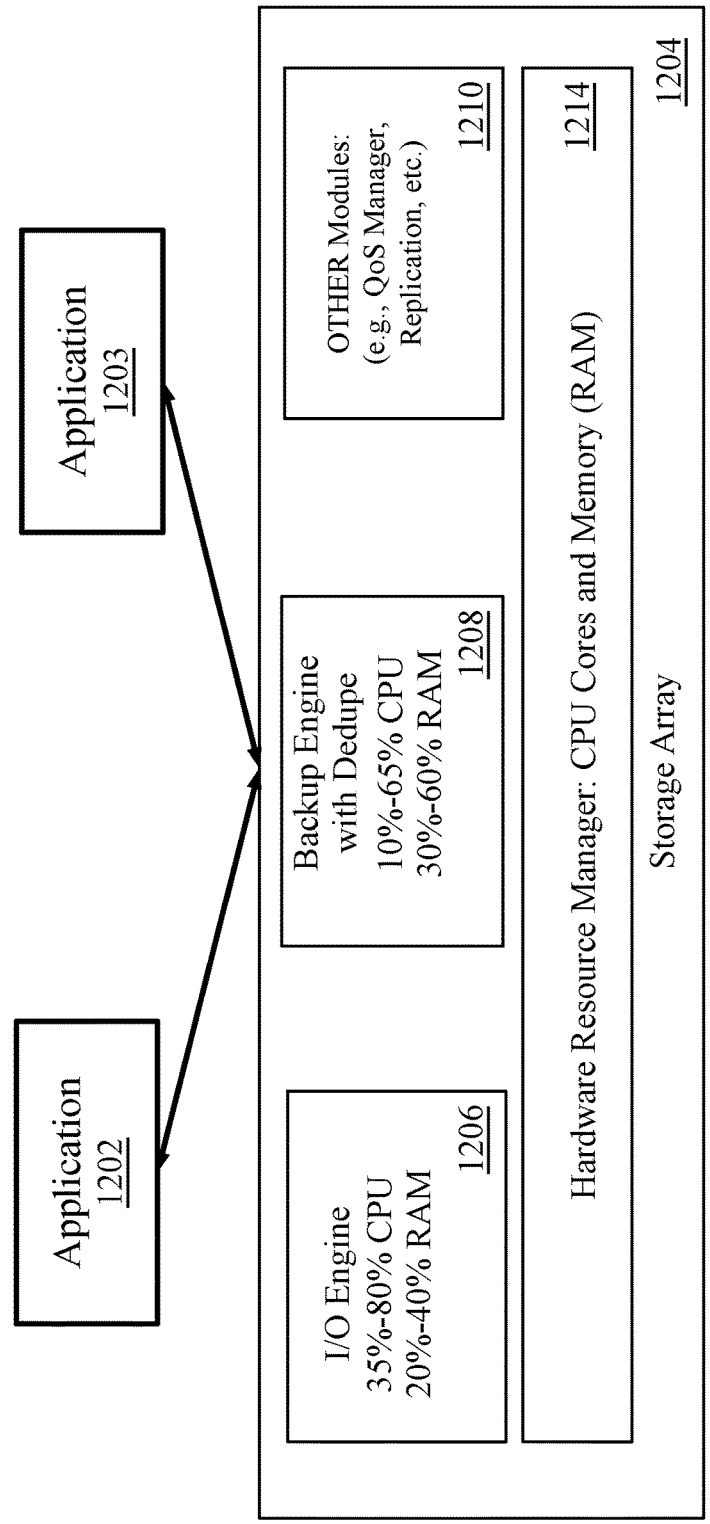

FIGS. 12A-12B are block diagrams illustrating a virtualized storage system 1200 in which I/O and compute resources can be dynamically reallocated. The virtualized storage system 1200 supports multiple applications (e.g., application 1202, application 1203) that are communicatively coupled with a virtualized storage array 1204 via a network or an internal system bus. The applications can be virtual applications executing in a virtual machine environment. The storage array 1204 includes an I/O engine 1206, a backup engine 1208, and one or more other modules 1210 including a QoS manager, data replication module, and other storage array modules. In one embodiment, each engine and module is a virtual module or application executing in a virtual environment.

In one embodiment, the storage array 1304 includes both primary storage and secondary storage. The primary storage within the storage array 1304 can be non-deduplicated, with deduplication occurring during backup to secondary storage, or the primary storage of the storage array 1304 can also include a deduplicated tier, as illustrated with respect to the storage arrays of FIG. 4 and FIG. 8. A hardware resource manager 1214 manages the virtualization of underlying hardware resources of the storage array 1204. In one embodiment the hardware resource manager 1214 manages compute and memory resources including a number of CPU cores allocated to an engine within the storage array and an amount of memory (e.g., RAM) allocated to an engine.

FIG. 12A illustrates a scenario in which the backup engine 1208 is idle. In one embodiment the hardware resource manager 1214 maintains a minimum 'fixed' pool of resources that are allocated for the I/O engine at any given time such that access requests to storage resources within the storage array 1204 can be serviced. This fixed pool can then be augmented via a flex resource pool that can be shifted between engines and modules of the storage array 1204. The backup engine 1208 can be dynamically allocated resources as needed. When the backup engine 1208 is idle, the hardware resource manager 1214 can allocate all resources associated with the backup engine 1208 to the I/O engine 1206 to enable the I/O engine 1206 to provide storage resources to application 1202 and application 1203, or can allocate at least some of the resources otherwise used by the backup engine 1208 to other modules 1210.

FIG. 12B illustrates exemplary resource allocations when the backup engine 1208 is operational. When the data protection feature of the storage array 1204 is triggered, the backup engine 1208 can be enabled to backup primary storage elements of the storage array 1204 to secondary storage within the storage array 1204. The hardware resource manager 1214 can then allocate compute and memory resources to the backup engine 1208 to perform the backup operations. As the backup engine 1208 can be configured to perform deduplication operations during backup, the nature of the backup stream can impact the optimal resource mix between the I/O engine 1206 and the backup engine 1208. When the backup stream contains unique data, the backup operation will be I/O intensive. When the backup stream contains a large amount of duplicate data, then backup operation will be computationally intensive. In general, the backup engine 1208 can expect a mix of data streams, in which a backup data stream or a portion of the backup data stream will be compute intensive due to a high degree of deduplication, while a different backup data stream or a different portion of the backup data stream will be I/O intensive due to a large amount of unique data. This mix of data streams may cause difficulty in determining the optimal resource balance between the I/O engine 1206 and the backup engine 1208.

Figure 13:
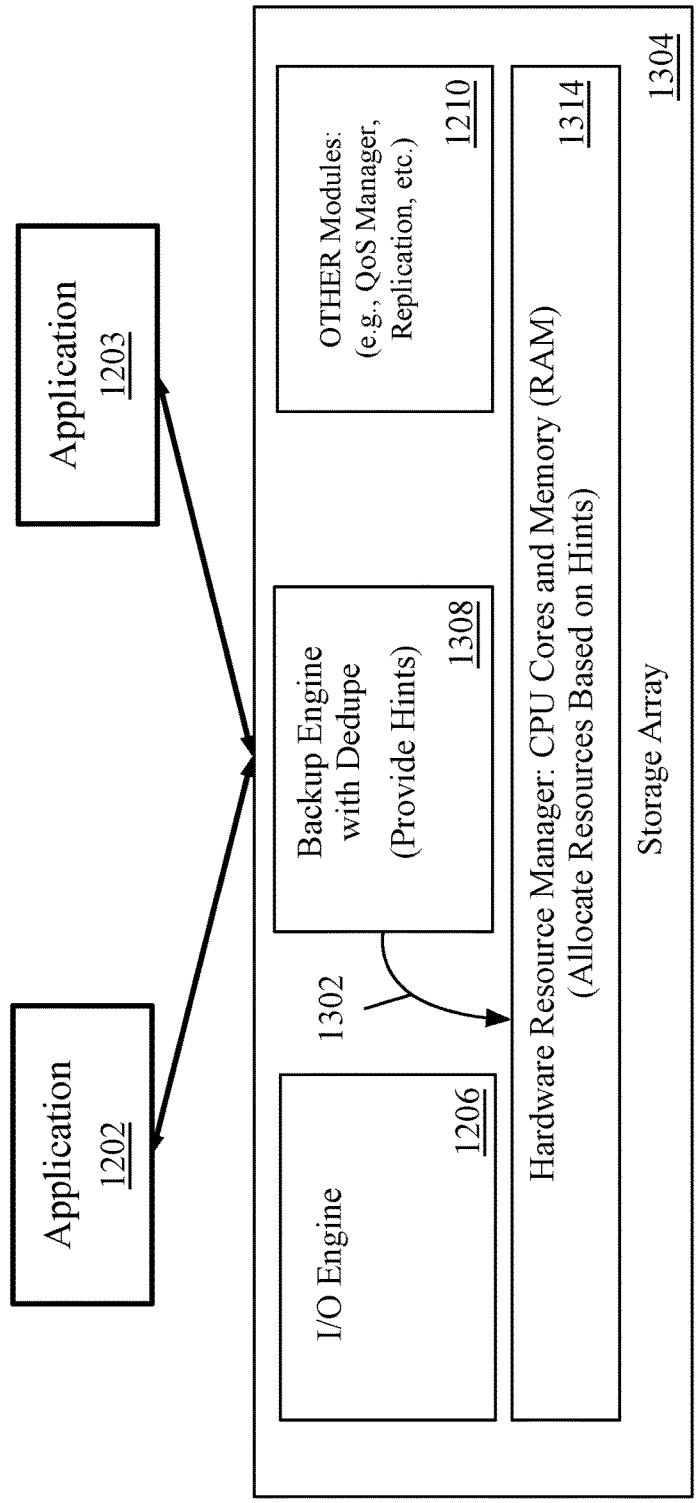
FIG. 13 is a block diagram of a virtualized storage system, according to an embodiment.

FIG. 13 is a block diagram of a virtualized storage system 1300, according to an embodiment. The virtualized storage system 1300 is similar to the virtualized storage system 1200 of FIGS. 12A-12B, but includes an enhanced storage array 1304 including a backup engine 1308 that is configured to provide resource hints to a hardware resource manager 1314. The backup engine 1308 can provide hints 1302 related to the predicted resource requirements for a backup operation and the hardware resource manager 1314 can consider those hints 1302 and, if possible, can allocate resources to the I/O engine 1206, backup engine 1308, and other modules 1210 based on the provided hints 1302.

For example, for a new backup operation, the backup engine 1308 can default to an assumption of a highly unique data stream, as the backup volume is populated with new and likely unique data. Thus, for new backup operations, the backup engine 1308 can provide a hint 1302 to the hardware resource manager 1314 that more resources should be provided to the I/O engine 1206. Over time, the backup engine 1308 can begin to form predictions on whether subsequent backup operations of the same source will continue to contain unique data or whether the backup operations will be highly duplicative. If the backup data stream begins to become highly duplicative, the backup engine 1308 can provide hints 1302 to the hardware resource manager 1314 to request additional CPU and memory resources. While in one embodiment the resource manager allocates CPU resources, other relevant processing resources can also be allocated based the hint 1302, such as any processors, coprocessors, or accelerators associated with backup or storage operations.

As backups tend to be cyclical, over time the backup engine 1308 can begin to form increasingly accurate predictions of the type of data stream that will arrive at any given time. In one embodiment, once the backup engine 1308 is able to predict whether a given backup data stream will contain a large amount of unique or duplicate data, the backup engine 1308 can then begin to re-schedule the backup operations to group multiple backup operations of the same type. The backup engine 1308 can then provide hints 1302 to the hardware resource manager 1314 for a given epoch and perform the appropriate types of backup operations based on the requested resource mix. Once the set of backup operations within a given epoch are complete, the backup engine 1308 can provide hints 1302 to the hardware resource manager 1314 to adjust the resource mix for the next epoch.

Figure 14A:
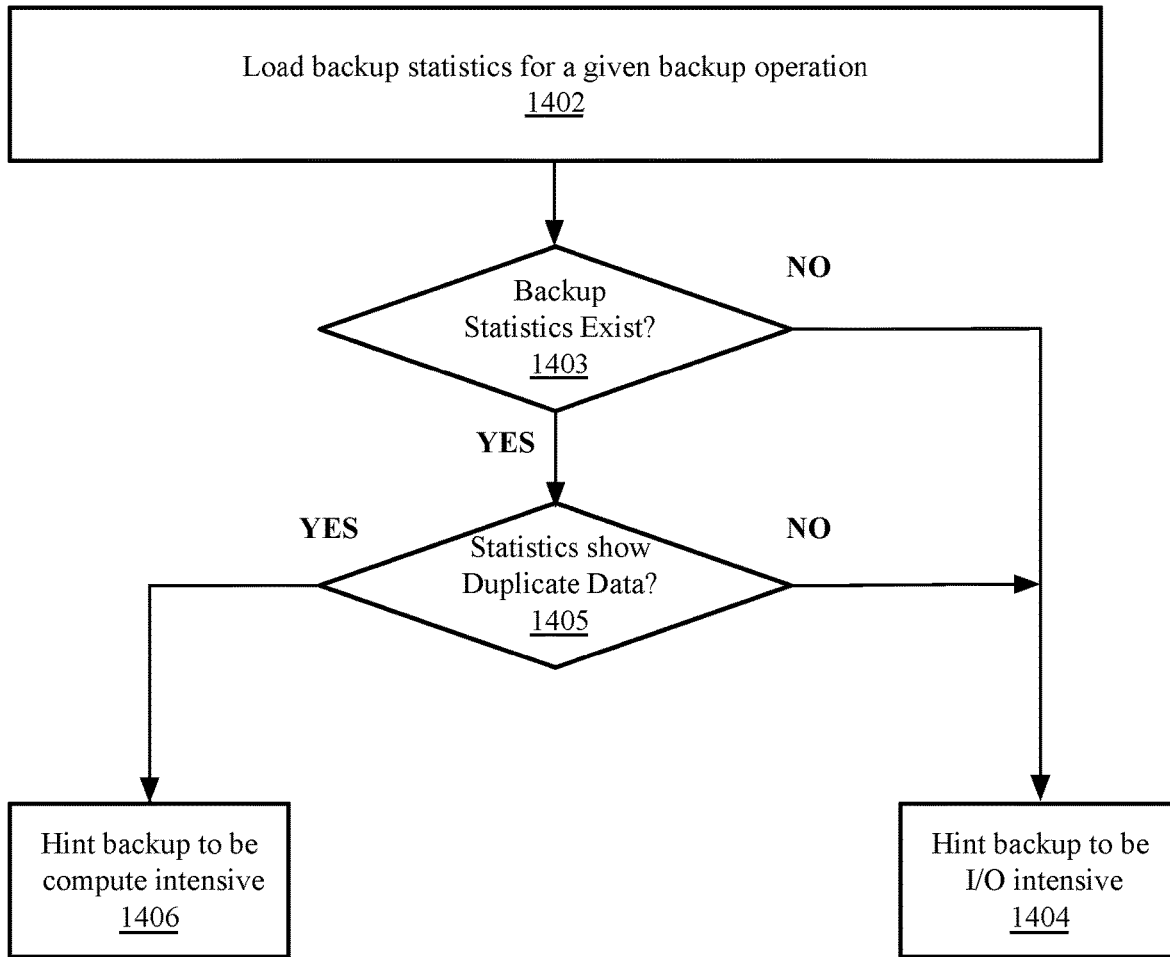
FIGS. 14A-14B are flow diagrams of logic to provide resource hints for resource allocation within a primary storage system.
Figure 14B:
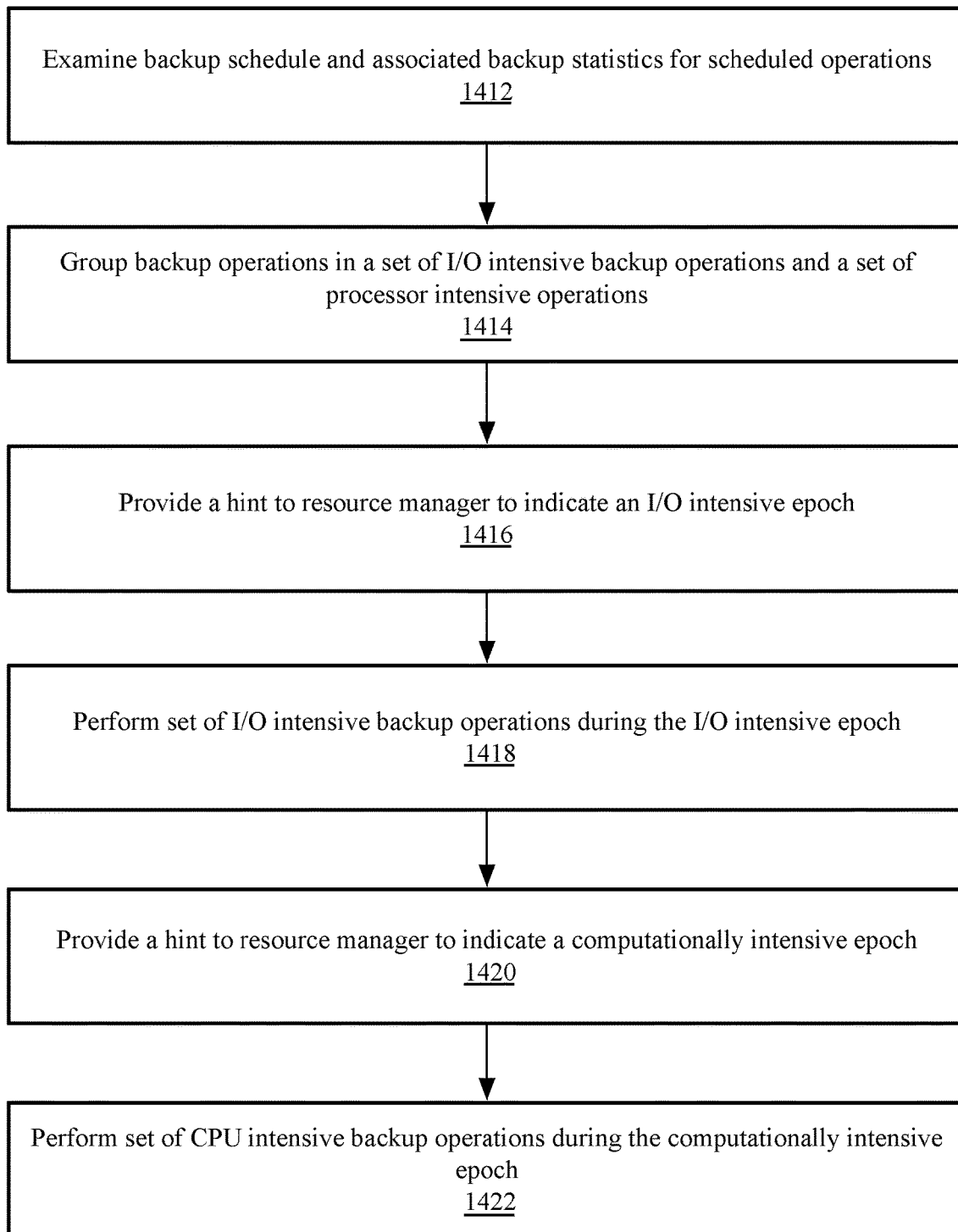

FIGS. 14A-14B are flow diagrams of logic 1400 and logic 1410, which provide resource hints for resource allocation within a primary storage system including virtualized embedded data protection. In one embodiment, operations of logic 1400 and logic 1410 are performed by a backup engine, such as the backup engine 1308 of FIG. 13. The backup engine provides hints to a hardware resource manager, such as the hardware resource manager 1314 of FIG. 13. In such embodiment the backup engine is a virtualized guest executing in a virtual environment and the hardware resource manager is a portion of a virtual machine manger. The hardware resource manager is able to dynamically reallocate resources between guests in the virtual environment.

FIG. 14A is a flow diagram of logic 1400 for dynamic resource hinting by a virtualized backup engine, according to an embodiment. As shown at 1402, the logic 1400 can load backup statistics for a given backup operation. If the backup operation is a new backup operation, backup statistics may not exist for the operation. If backup statistics do not exist, as determined at 1403, the logic 1400 can default to hinting for I/O intensive operations at 1404, as unique data streams require more I/O resources to store the unique data.

If the logic 1400 determines at 1403 that backup statistics exist, the logic 1400 can determine at 1405 whether the statistics show that the backup stream historically has been dominated by duplicate data. Backup operations for duplicate data are not I/O intensive, as the duplicate date blocks are not stored. Moreover, the deduplication process can be computationally intensive due to the management and updating of the deduplication metadata for the duplicate data in the data stream. Thus, if the statistics show that the backup operation will be dominated by duplicate data, the logic 1400 can provide a hint that the backup will be compute intensive. Otherwise, the logic 1400 can provide a hint that the backup will be I/O intensive at 1404.

FIG. 14B is a flow diagram of logic 1410 for backup scheduling operations based on backup data stream statistics, according to an embodiment. In one embodiment the logic 1410 can examine a backup schedule and associated backup statistics for scheduled operations, as shown at 1412. At 1414, the logic 1400 can group backup operations into a set of I/O intensive backup operations and a set of computationally intensive backup operations.

Once the backup operations are grouped into sets of operations, the logic 1400 can provide a hint to a resource manager of the virtual environment to indicate an impending I/O intensive epoch at 1416. During the I/O intensive epoch the resource manager may provide additional scheduling resources to an I/O engine of the virtual environment, for example, from a flex pool of virtual resources that can be used to scale the performance of the I/O engine. To exploit this period of improved I/O performance during the I/O intensive epoch, the logic 1400 can perform a set of I/O intensive backup operations at 1418 while I/O performance is improved.

The scheduling epochs of the resource manager can be coarsely grained to prevent resource thrashing and unpredictable operations and can be maintained for a pre-determined period of time. At 1410, the logic can provide a hint to the resource manager that the next epoch will be computationally intensive scheduling epoch at 1420. During the computationally intensive scheduling epoch the logic 1400 can perform a set of computationally intensive backup operations, such as backup operations that involve a large amount of data deduplication, as shown at 1422.

Figure 15:
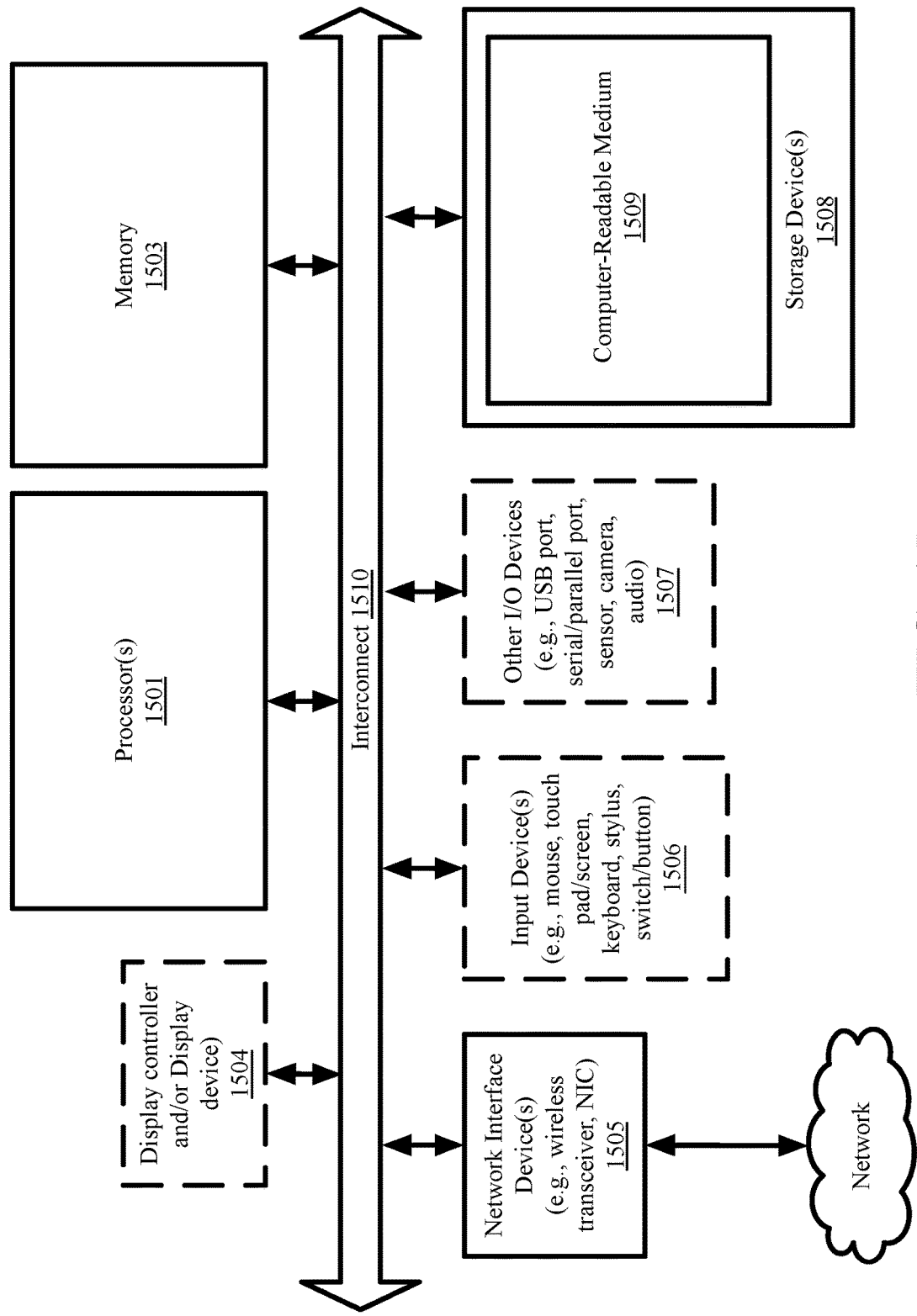
FIG. 15 is a block diagram illustrating an example of a data processing system that may be used with embodiments described herein.

FIG. 15 is a block diagram illustrating an example of a data processing system 1500 that may be used with embodiments described herein. The data processing system 1500 may represent any of the data processing systems described above and may perform any of the processes or methods described above. The data processing system 1500 can include many different components. These components can be implemented as integrated circuits (ICs), discrete electronic devices, or other modules adapted to a circuit board such as a motherboard or add-in card of the computer system, or as components otherwise incorporated within a chassis of the computer system. Note also that the data processing system 1500 is intended to show a high-level view of many components of the computer system. However, it is to be understood that additional components may be present in certain implementations and furthermore, different arrangement of the components shown may occur in other implementations. The data processing system 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment the data processing system 1500 includes one or more processor(s) 1501, memory 1503, network interface devices, 1505, I/O devices, 1506, 1507 and storage device(s) 1508 connected via a bus or an interconnect 1510. The one or more processor(s) 1501 may be a single processor or multiple processors with a single processor core or multiple processor cores included therein. The processor(s) 1501 may represent one or more general-purpose processors such as a microprocessor, a central processing unit (CPU), or the like. More particularly, the processor(s) 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor(s) 1501 may be a low power multi-core processor, such as an ultra-low voltage processor, and may act as a main processing unit and central hub for communication with the various components of the system. Such processor can be implemented as a system on chip (SoC). The processor(s) 1501 are configured to execute instructions for performing the operations and steps discussed herein. The data processing system 1500 may further include a graphics/display subsystem 1504, which may include a display controller, a graphics processor, and/or a display device. In one embodiment at least a portion of the graphics/display subsystem 1504 is integrated into the processors(s) 1501. The graphics/display subsystem 1504 is optional and some embodiments may not include one or more components of the graphics/display subsystem 1504.

The processor(s) 1501 communicates with memory 1503, which in one embodiment can be implemented via multiple memory devices to provide for a given amount of system memory. The memory 1503 may include one or more volatile storage (or memory) devices such as random access memory (RAM), dynamic RAM (DRAM), synchronous DRAM (SDRAM), static RAM (SRAM), or other types of storage devices. The memory 1503 may store information including sequences of instructions that are executed by the one or more processor(s) 1501 or any other device. For example, executable code and/or data of a variety of operating systems, device drivers, firmware (e.g., input output basic system or BIOS), and/or applications can be loaded in the memory 1503 and executed by one of the processor(s) 1501. The operating system can be any kind of operating system such as, for example, Windows® operating system from Microsoft®, Mac OS/iOS from Apple, Android® from Google®, Linux®, Unix®, or other real-time or embedded operating systems such as VxWorks.

The data processing system 1500 may further include I/O devices such as a network interface device(s) 1505, input device(s) 1506, and other I/O device(s) 1507. Some of the input device(s) 1506 and other I/O device(s) 1507 may be optional and are excluded in some embodiments. The network interface device(s) 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

The input device(s) 1506 may include a mouse, a touch pad, a touch sensitive screen (which may be integrated with a display device of the graphics/display subsystem 1504), a pointer device such as a stylus, and/or a keyboard (e.g., physical keyboard or a virtual keyboard displayed as part of a touch sensitive screen). For example, the input device(s) 1506 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The other I/O device(s) 1507 may also include an audio device. An audio device may include a speaker and/or a microphone to facilitate voice-enabled functions, such as voice recognition, voice replication, digital recording, and/or telephony functions. The other I/O device(s) 1507 may also include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The other I/O device(s) 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of data processing system 1500.

To provide for persistent storage of information such as data, applications, one or more operating systems and so forth, a mass storage (not shown) may also couple to the processor(s) 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of flash based storage to act as an SSD cache to enable non-volatile storage of context state and other such information during power down events so that a fast power up can occur on re-initiation of system activities. In addition, a flash device may be coupled to the processor(s) 1501, e.g., via a serial peripheral interface (SPI). This flash device may provide for non-volatile storage of system software, including a basic input/output software (BIOS) as well as other firmware of the system.

The storage device(s) 1508 may include computer-readable storage medium 1509 (also known as a machine-readable storage medium) on which is stored one or more sets of instructions or software embodying any one or more of the methodologies or functions described herein. The computer-readable storage medium 1509 may also be used to store the some software functionalities described above persistently. While the computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while the data processing system 1500 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

Embodiment described herein provide for a system, method, and apparatus for improving deduplicated storage tier management for primary storage arrays. Some embodiments provide a system and associated method of improving deduplicated storage tier management for primary storage arrays by including workload aggregation statistics. Some embodiments provide for a system and method of dynamic system resource allocation for primary storage systems with virtualized embedded data protection. Some embodiments provide for a system and method for intelligent data movements between non-deduplicated and deduplicated tiers in a primary storage array.

One embodiment provides for a data storage system comprising a primary storage array including multiple storage tiers, the multiple storage tiers comprising a first storage tier including a first set of storage devices and a second storage tier including a second set of storage devices, wherein the second storage tier includes deduplicated data. The data storage system additionally includes management logic to manage the second storage tier. The management logic is configured to receive a request to store a unit of deduplicated data to the second set of storage devices and respond to the request to store the unit of deduplicated data based on workload statistics associated with the unit of deduplicated data. To respond to the request includes to store at least a portion of the deduplicated data to a first storage device in the second set of storage devices and the workload statistics include input/output (I/O) statistics associated with the unit of deduplicated data.

One embodiment provides for a method of managing a deduplicated storage tier of a primary storage array. The method comprises receiving migration of a unit of deduplicated data at a second storage tier of the primary storage array, the unit of deduplicated data received from a first storage tier of the primary storage array, wherein the first storage tier includes a first set of storage devices, the second storage tier includes a second set of storage devices, and the second storage tier is the deduplicated storage tier of the primary storage array; storing at least a portion of the unit of deduplicated data to a first storage device in the second set of storage devices; and determining an action for the unit of deduplicated data based on workload statistics for the unit of deduplicated data, the workload statistics including input/output (I/O) statistics associated with the unit of deduplicated data.

One embodiment provides for a data storage system comprising a storage array including one or more storage tiers of primary storage; an I/O engine to manage I/O requests for the storage array; a virtual execution environment to execute a virtual backup engine, the virtual backup engine to generate backup data for the one or more storage tiers of primary storage and deduplicate the backup data; and a resource manager to manage a resource allocation to the virtual backup engine based on a hint received from the virtual backup engine, the hint associated with a backup operation that has a characterization selected from a set including computationally intensive and I/O intensive.

One embodiment provides for a method of configuring resource allocation to a virtual execution environment on a data storage system having a primary storage array, the method comprising determining a workload characterization of a backup operation of a virtual backup engine in the virtual execution environment, the virtual backup engine to backup and deduplicate data of the primary storage array; providing a first hint to a resource manager of the data storage system to indicate a period of backup operations having a first workload characterization; and performing a first set of backup operations via the virtual backup engine, the first set of backup operations having the first workload characterization.

Embodiments also include one or more non-transitory machine readable media storing instructions to perform any one of the methods described herein.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

What is claimed is:

1. A data storage system comprising:
a storage array including one or more storage tiers of primary storage;
an input/output (I/O) engine to manage I/O requests for the storage array;
a virtual execution environment to execute a virtual backup engine, the virtual backup engine to generate backup data for the one or more storage tiers of primary storage and deduplicate the backup data; and
a resource manager to manage a resource allocation to the virtual backup engine based on a hint received from the virtual backup engine,
wherein the hint is associated with a backup operation and indicates whether the backup operation is computationally intensive or I/O intensive,
wherein whether the backup operation is computationally intensive or I/O intensive is determined based on an analysis of backup statistics of the backup operation, and
wherein the hint is based at least on whether the backup operation is from a particular source; and,
wherein when the hint received from the virtual backup engine indicates I/O intensive backup operation, the resource manager allocates additional CPU and storage resources to the I/O engine, and when the hint received from the virtual backup engine indicates computationally intensive backup operation, the resource manager allocates additional CPU and storage resources to the virtual backup engine.

2. The data storage system as in claim 1, wherein managing the resource allocation to the virtual backup engine includes managing the resource allocation to the virtual execution environment.

3. The data storage system as in claim 1, wherein the virtual backup engine is to characterize a backup operation as computationally intensive when the backup statistics indicate a large amount of data duplication.

4. The data storage system as in claim 1, wherein the virtual backup engine is to characterize a backup operation as I/O intensive when the backup statistics indicate a large amount of unique data.

5. The data storage system as in claim 1, wherein the virtual backup engine groups backup operations based on characterization to generate a first group of backup operations and a second group of backup operations, the first group of backup operations characterized as computationally intensive and the second group of backup operations characterized as I/O intensive.

6. The data storage system as in claim 5, wherein the virtual backup engine is further to:
provide a hint to the resource manager to indicate an I/O intensive period;
perform a set of I/O intensive backup operations during the I/O intensive period;
provide a hint to the resource manager to indicate a computationally intensive period; and
perform a set of computationally intensive backup operations during the computationally intensive period.

7. The data storage system as in claim 6, wherein the resource manager is further to:
receive a hint from the virtual backup engine indicating an I/O intensive period;
allocate additional processor or memory resources to the I/O engine during a resource allocation adjustment;
receive a hint from the virtual backup engine indicating a computationally intensive period; and
allocate additional processor or memory resources for use by the virtual backup engine during a resource allocation adjustment.

8. A method of configuring resource allocation to a virtual execution environment on a data storage system having a primary storage array, the method comprising:
determining a workload characterization of a backup operation of a virtual backup engine in the virtual execution environment, the virtual backup engine to backup and deduplicate data of the primary storage array;
providing a first hint to a resource manager of the data storage system to indicate a period of backup operations having a first workload characterization, wherein the first hint indicates whether the backup operation is computationally intensive or I/O intensive, wherein whether the backup operation is computationally intensive or I/O intensive is determined based on an analysis of backup statistics of the backup operation, and wherein the first hint indicates computationally intensive backup operation when the backup statistics indicates a large amount of data duplication and indicates an I/O intensive backup operation when the backup statistics indicates a low amount of data duplication;
managing, by the source manager, a CPU or memory resource allocation to the virtual backup engine based on the first hint received from the virtual backup engine for the backup operation by assigning additional CPU or memory resource to I/O operations when the hint indicates I/O intensive backup operation and assigning additional CPU or memory resource to deduplication operations when the hint indicates computationally intensive backup operation; and
performing a first set of backup operations via the virtual backup engine, the first set of backup operations having the first workload characterization.

9. A method as in claim 8, additionally including:
providing a second hint to the resource manager of the data storage system to indicate a period of backup operations having a second workload characterization; and
performing a second set of backup operations via the virtual backup engine, the second set of backup operations having the second workload characterization.

10. The method as in claim 9, additionally including:
generating a schedule of backup operations of the virtual backup engine;
examining backup statistics associated with backup operations in the schedule of backup operations; and
grouping scheduled backup operations based on a workload characterization of the backup operations.

11. The method as in claim 10, additionally comprising characterizing a backup operation based on an amount of unique or duplicate data in a backup operation as indicated in the backup statistics.

12. The method as in claim 11, additionally comprising:
characterizing a first backup operation as having the first workload characteristic when the workload of the first backup operation is I/O intensive; and
characterizing a second backup operation as having the second workload characteristic when the workload of the second backup operation is computationally intensive.

13. One or more non-transitory machine readable media storing instructions which, when executed by one or more processors, cause the one or more processors to perform operations to configure resource allocation to a virtual execution environment on a data storage system having a primary storage array, the operations comprising:
determining a workload characterization of a backup operation of a virtual backup engine in the virtual execution environment, the virtual backup engine to backup and deduplicate data of the primary storage array;
providing a first hint to a resource manager of the data storage system to indicate a period of backup operations having a first workload characterization, wherein the first hint indicates whether the backup operation is computationally intensive or I/O intensive, wherein whether the backup operation is computationally intensive or PO intensive is determined based on an analysis of backup statistics of the backup operation, and wherein the first hint indicates computationally intensive backup operation when the backup statistics indicates a large amount of data duplication and indicates an I/O intensive backup operation when the backup statistics indicates a low amount of data duplication;
managing, by the source manager, a CPU or memory resource allocation to the virtual backup engine based on the first hint received from the virtual backup engine for the backup operation by assigning additional CPU or memory resource to I/O operations when the hint indicates I/O intensive backup operation and assigning additional CPU or memory resource to deduplication operations when the hint indicates computationally intensive backup operation; and
performing a first set of backup operations via the virtual backup engine, the first set of backup operations having the first workload characterization.

14. The one or more non-transitory machine readable media as in claim 13, the operations additionally including:
> providing a second hint to the resource manager of the data storage system to indicate a period of backup operations having a second workload characterization; and
>
> performing a second set of backup operations via the virtual backup engine, the second set of backup operations having the second workload characterization.

15. The one or more non-transitory machine readable media as in claim 14, the operations additionally including:
> generating a schedule of backup operations of the virtual backup engine;
>
> examining backup statistics associated with backup operations in the schedule of backup operations; and
>
> grouping scheduled backup operations based on a workload characterization of the backup operations.

16. The one or more non-transitory machine readable media as in claim 15, the operations additionally comprising characterizing a backup operation based on an amount of unique or duplicate data in a backup operation as indicated in the backup statistics.

17. The one or more non-transitory machine readable media as in claim 16, the operations additionally comprising:
> characterizing a first backup operation as having a first workload characteristic when the workload of the first backup operation is I/O intensive; and
>
> characterizing a second backup operation as having the second workload characteristic when the workload of the second backup operation is computationally intensive.

18. The one or more non-transitory machine readable media as in claim 13,
> wherein managing the resource allocation to the virtual backup engine includes managing the resource allocation to the virtual execution environment.

\* \* \* \* \*

UNITED STATES PATENT AND TRADEMARK OFFICE
CERTIFICATE OF CORRECTION

| | |
|---|---|
| PATENT NO. | : 11,513,902 B1 |
| APPLICATION NO. | : 15/280723 |
| DATED | : November 29, 2022 |
| INVENTOR(S) | : Stephen Smaldone, Ian Wigmore and Arieh Don |

It is certified that error appears in the above-identified patent and that said Letters Patent is hereby corrected as shown below:

In the Claims

In Claim 13, Column 28, Line 49, delete "or PO intensive" and insert --or I/O intensive--.

Signed and Sealed this
Twelfth Day of December, 2023

Katherine Kelly Vidal
*Director of the United States Patent and Trademark Office*